US012548578B2

(12) United States Patent
Gao et al.

(10) Patent No.: US 12,548,578 B2
(45) Date of Patent: Feb. 10, 2026

(54) THREE-DIMENSIONAL AUDIO SIGNAL CODING METHOD AND APPARATUS, AND ENCODER

(71) Applicant: HUAWEI TECHNOLOGIES CO., LTD., Guangdong (CN)

(72) Inventors: Yuan Gao, Beijing (CN); Shuai Liu, Beijing (CN); Bin Wang, Shenzhen (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 18/509,653

(22) Filed: Nov. 15, 2023

(65) Prior Publication Data

US 2024/0079017 A1 Mar. 7, 2024

Related U.S. Application Data

(63) Continuation of application No. PCT/CN2022/091557, filed on May 7, 2022.

(30) Foreign Application Priority Data

May 17, 2021 (CN) ........................ 202110536634.9

(51) Int. Cl.

*G10L 19/008* (2013.01)
*G10L 19/16* (2013.01)
*H04S 7/00* (2006.01)

(52) U.S. Cl.

CPC .......... *G10L 19/008* (2013.01); *G10L 19/167* (2013.01); *H04S 7/302* (2013.01); *H04S 2400/11* (2013.01); *H04S 2420/11* (2013.01)

(58) Field of Classification Search

CPC ..... G10L 19/008; G10L 19/167; H04S 7/302; H04S 2400/11; H04S 2420/11

(Continued)

(56) References Cited

U.S. PATENT DOCUMENTS

| | | | | |
|---|---|---|---|---|
| 2014/0307877 | A1 | 10/2014 | Sumioka et al. | |
| 2016/0007132 | A1* | 1/2016 | Peters | H04S 3/008 381/17 |

(Continued)

FOREIGN PATENT DOCUMENTS

| | | | |
|---|---|---|---|
| CN | 107147975 | A | 9/2017 |
| JP | 2017507350 | A | 3/2017 |
| JP | 2019527855 | A | 10/2019 |

OTHER PUBLICATIONS

Suzuki Ryuichi et al., "Instantaneous intensity of attenuation cancellation in impulse response of indoor sound field",Sep. 5, 2014,with English translation total 10 pages.

*Primary Examiner* — Duc Nguyen
*Assistant Examiner* — Chimezie Ezeriwe Bekee
(74) *Attorney, Agent, or Firm* — WOMBLE BOND DICKINSON (US) LLP

(57) ABSTRACT

A three-dimensional audio signal encoding method and apparatus, and an encoder are provided, and relate to the multimedia field. The method includes: The encoder obtains a first quantity of current-frame initial vote values for a current frame of a three-dimensional audio signal. Then, the encoder obtains, based on the first quantity of current-frame initial vote values and a sixth quantity of previous-frame final vote values, a seventh quantity of current-frame final vote values that are of a seventh quantity of virtual loudspeakers and that correspond to the current frame. Further, the encoder selects a second quantity of current-frame representative virtual loudspeakers from the seventh quantity of virtual loudspeakers based on the seventh quantity of current-frame final vote values. The encoder encodes the current frame based on the second quantity of current-frame representative virtual loudspeakers, to obtain a bitstream.

20 Claims, 11 Drawing Sheets

(58) Field of Classification Search
USPC .................... 700/94; 704/500, 501, 502, 503
See application file for complete search history.

(56) References Cited

U.S. PATENT DOCUMENTS

| | | | | |
|---|---|---|---|---|
| 2017/0105082 | A1* | 4/2017 | Kim .......................... | H04S 3/02 |
| 2018/0308500 | A1 | 10/2018 | Krueger et al. | |
| 2019/0379992 | A1 | 12/2019 | Schmidt et al. | |
| 2020/0335113 | A1* | 10/2020 | Kim .......................... | H04S 3/02 |

* cited by examiner (a)

(b)

THREE-DIMENSIONAL AUDIO SIGNAL CODING METHOD AND APPARATUS, AND ENCODER

CROSS-REFERENCE TO RELATED APPLICATIONS

This application is a continuation of International Application No. PCT/CN2022/091557, filed on May 7, 2022, which claims priority to Chinese Patent Application No. 202110536634.9, filed on May 17, 2021. The disclosures of the aforementioned applications are hereby incorporated by reference in their entireties.

TECHNICAL FIELD

This application relates to the multimedia field, and in particular, to a three-dimensional audio signal coding method and apparatus, and an encoder.

BACKGROUND

With rapid development of high-performance computers and signal processing technologies, listeners raise increasingly high requirements for voice and audio experience. Immersive audio can meet people's requirements for the voice and audio experience. For example, a three-dimensional audio technology is widely used in wireless communication (for example, 4G/5G) voice, virtual reality/augmented reality, and a media audio. The three-dimensional audio technology is an audio technology for obtaining, processing, transmitting, rendering, and reproducing sound and three-dimensional sound field information in the real world, to provide the sound with strong senses of space, envelopment, and immersion. This provides the listeners with extraordinary "immersive" auditory experience.

Generally, an acquisition device (for example, a microphone) acquires a large amount of data to record three-dimensional sound field information, and transmits a three-dimensional (3D) audio signal to a playback device (for example, a loudspeaker or a headset), so that the playback device plays three-dimensional audio. Because a data amount of the three-dimensional sound field information is large, a large amount of storage space is required for storing the data, and high bandwidth is required for transmitting the three-dimensional audio signal. To resolve the foregoing problems, the three-dimensional audio signal may be compressed, and compressed data may be stored or transmitted. Currently, an encoder first traverses virtual loudspeakers in a set of candidate virtual loudspeakers, and compresses a three-dimensional audio signal by using a selected virtual loudspeaker. However, if selection results of the virtual loudspeakers for consecutive frames differ greatly, a spatial image of the reconstructed three-dimensional audio signal is unstable, and sound quality of the reconstructed three-dimensional audio signal is reduced.

SUMMARY

This application provides a three-dimensional audio signal coding method and apparatus, and an encoder, to enhance directional continuity between frames, improve stability of a spatial image of the reconstructed three-dimensional audio signal, and ensure sound quality of the reconstructed three-dimensional audio signal.

According to a first aspect, this application provides a three-dimensional audio signal encoding method. After obtaining a first quantity of current-frame initial vote values for a current frame of a three-dimensional audio signal, the encoder obtains, based on the first quantity of current-frame initial vote values, and a sixth quantity of previous-frame final vote values that are of a sixth quantity of virtual loudspeakers and that correspond to a previous frame of the three-dimensional audio signal, a seventh quantity of current-frame final vote values that are of a seventh quantity of virtual loudspeakers and that correspond to the current frame. The virtual loudspeakers one-to-one correspond to the current-frame initial vote values. A first quantity of virtual loudspeakers include a first virtual loudspeaker. A current-frame initial vote value of the first virtual loudspeaker indicates a priority of using the first virtual loudspeaker when the current frame is encoded. The seventh quantity of virtual loudspeakers include the first quantity of virtual loudspeakers, and the seventh quantity of virtual loudspeakers include the sixth quantity of virtual loudspeakers. Further, the encoder selects a second quantity of current-frame representative virtual loudspeakers from the seventh quantity of virtual loudspeakers based on the seventh quantity of current-frame final vote values, where the second quantity is less than the seventh quantity, indicating that the second quantity of current-frame representative virtual loudspeakers are some virtual loudspeakers of the seventh quantity of virtual loudspeakers; and encodes the current frame based on the second quantity of current-frame representative virtual loudspeakers, to obtain a bitstream.

In a virtual loudspeaker search procedure, because locations of real sound sources do not necessarily overlap locations of the virtual loudspeakers, the virtual loudspeakers do not necessarily one-to-one correspond to the real sound sources. In addition, in an actual complex scenario, a set of a limited quantity of virtual loudspeakers may not represent all sound sources in a sound field. In this case, the found virtual loudspeakers between frames may change frequently. The changes affect auditory experience of a listener. As a result, obvious discontinuity and noise phenomena appear in the three-dimensional audio signal obtained through decoding and reconstruction. In the virtual loudspeaker selection method according to this embodiment of this application, the previous-frame representative virtual loudspeaker is retained. To be specific, for virtual loudspeakers with same serial numbers, the current-frame initial vote value is adjusted based on the previous-frame final vote value, so that the encoder tends to select the previous-frame representative virtual loudspeaker. In this way, frequent changes of the virtual loudspeakers between the frames are reduced, signal directional continuity between the frames is enhanced, a spatial image of the reconstructed three-dimensional audio signal is improved, and sound quality of the reconstructed three-dimensional audio signal is ensured.

For example, if the sixth quantity of virtual loudspeakers include the first virtual loudspeaker, the obtaining, based on the first quantity of current-frame initial vote values, and a sixth quantity of previous-frame vote values that are of the sixth quantity of virtual loudspeakers and that correspond to the previous frame of the three-dimensional audio signal, a seventh quantity of current-frame final vote values that are of a seventh quantity of virtual loudspeakers and that correspond to the current frame includes: updating the current-frame initial vote value of the first virtual loudspeaker based on a previous-frame final vote value of the first virtual loudspeaker, to obtain a current-frame final vote value of the first virtual loudspeaker.

In a possible embodiment, if the first quantity of virtual loudspeakers include a second virtual loudspeaker, and the sixth quantity of virtual loudspeakers do not include the second virtual loudspeaker, a current-frame final vote value of the second virtual loudspeaker is equal to a current-frame initial vote value of the second virtual loudspeaker. Alternatively, if the sixth quantity of virtual loudspeakers include a third virtual loudspeaker, and the first quantity of virtual loudspeakers do not include the third virtual loudspeaker, a current-frame final vote value of the third virtual loudspeaker is equal to a previous-frame final vote value of the third virtual loudspeaker.

In another possible embodiment, when updating the current-frame initial vote value of the first virtual loudspeaker based on a previous-frame final vote value of the first virtual loudspeaker, the encoder adjusts the previous-frame final vote value of the first virtual loudspeaker based on a first adjustment parameter, to obtain an adjusted previous-frame vote value of the first virtual loudspeaker; and updates the current-frame initial vote value of the first virtual loudspeaker based on the adjusted previous-frame vote value of the first virtual loudspeaker.

The first adjustment parameter is determined based on at least one of a quantity of directional sound sources in the previous frame, an encoding bit rate for encoding the current frame, and a frame type. In this way, the encoder adjusts the previous-frame final vote value of the first virtual loudspeaker based on the first adjustment parameter, so that the encoder tends to select the previous-frame representative virtual loudspeaker. In this way, the directional continuity between the frames is enhanced, the spatial image of the reconstructed three-dimensional audio signal is improved, and the sound quality of the reconstructed three-dimensional audio signal is ensured.

In another possible embodiment, when updating the current-frame initial vote value of the first virtual loudspeaker based on the adjusted previous-frame vote value of the first virtual loudspeaker, the encoder adjusts the current-frame initial vote value of the first virtual loudspeaker based on a second adjustment parameter, to obtain an adjusted current-frame vote value of the first virtual loudspeaker; and updates the adjusted current-frame vote value of the first virtual loudspeaker based on the adjusted previous-frame vote value of the first virtual loudspeaker.

The second adjustment parameter is determined based on the adjusted previous-frame vote value of the first virtual loudspeaker and the current-frame initial vote value of the first virtual loudspeaker. In this way, the encoder adjusts the current-frame initial vote value of the first virtual loudspeaker based on the second adjustment parameter, and frequent changes of the current-frame initial vote value are reduced, so that the encoder tends to select the previous-frame representative virtual loudspeaker. In this way, the directional continuity between the frames is enhanced, the spatial image of the reconstructed three-dimensional audio signal is improved, and the sound quality of the reconstructed three-dimensional audio signal is ensured.

The second quantity indicates a quantity of current-frame representative virtual loudspeakers selected by the encoder. A larger second quantity indicates a larger quantity of current-frame representative virtual loudspeakers and more sound field information of the three-dimensional audio signal. A smaller second quantity indicates a smaller quantity of current-frame representative virtual loudspeakers and less sound field information of the three-dimensional audio signal. Therefore, the quantity of current-frame representative virtual loudspeakers selected by the encoder may be controlled by setting the second quantity. For example, the second quantity may be preset. For another example, the second quantity may be determined based on the current frame. For example, a value of the second quantity may be 1, 2, 4, or 8.

In another possible embodiment, when obtaining a first quantity of current-frame initial vote values that are of the first quantity of virtual loudspeakers and that correspond to a current frame of a three-dimensional audio signal, the encoder determines the first quantity of virtual loudspeakers and the first quantity of current-frame initial vote values based on a third quantity of representative coefficients of the current frame, a set of candidate virtual loudspeakers, and a quantity of vote rounds. The set of candidate virtual loudspeakers includes a fifth quantity of virtual loudspeakers. The fifth quantity of virtual loudspeakers include the first quantity of virtual loudspeakers. The first quantity is less than or equal to the fifth quantity. The quantity of vote rounds is an integer greater than or equal to 1, and the quantity of vote rounds is less than or equal to the fifth quantity.

Currently, in the virtual loudspeaker search procedure, the encoder uses a calculation result on a correlation between a to-be-encoded three-dimensional audio signal and the virtual loudspeaker as an indicator for virtual loudspeaker selection. In addition, if the encoder transmits one virtual loudspeaker for each coefficient, a purpose of efficient data compression cannot be achieved, causing heavy calculation load to the encoder. In the virtual loudspeaker selection method according to this embodiment of this application, the encoder replaces all coefficients of the current frame with a small quantity of representative coefficients to vote on each virtual loudspeaker in the set of candidate virtual loudspeakers, and selects a current-frame representative virtual loudspeaker based on a vote value. Further, the encoder uses the current-frame representative virtual loudspeaker to perform compression coding on the to-be-encoded three-dimensional audio signal. This effectively improves a compression ratio for performing compression coding on the three-dimensional audio signal, and reduces calculation complexity of searching for the virtual loudspeaker by the encoder. In this way, calculation complexity of performing compression coding on the three-dimensional audio signal is reduced, and calculation load of the encoder is reduced.

In another possible embodiment, before the determining the first quantity of virtual loudspeakers and the first quantity of current-frame initial vote values based on a third quantity of representative coefficients of the current frame, a set of candidate virtual loudspeakers, and a quantity of vote rounds, the method further, the encoder obtains a fourth quantity of coefficients of the current frame and frequency-domain feature values of the fourth quantity of coefficients; and selects the third quantity of representative coefficients from the fourth quantity of coefficients based on the frequency-domain feature values of the fourth quantity of coefficients. The third quantity is less than the fourth quantity, indicating that the third quantity of representative coefficients are some coefficients in the fourth quantity of coefficients.

The current frame of the three-dimensional audio signal is a higher-order ambisonics (HOA) signal, and the frequency-domain feature value of the coefficient is determined based on a coefficient of the HOA signal.

In this way, because the encoder selects some coefficients from all coefficients of the current frame as representative coefficients, and replaces all coefficients of the current frame with the small quantity of representative coefficients to select the representative virtual loudspeaker from the set of candidate virtual loudspeakers, the calculation complexity of searching for the virtual loudspeaker by the encoder is effectively reduced. In this way, the calculation complexity of performing compression coding on the three-dimensional audio signal is reduced, and the calculation load of the encoder is reduced.

In addition, when the encoder encodes the current frame based on the second quantity of current-frame representative virtual loudspeakers, to obtain a bitstream, the encoder generates a virtual loudspeaker signal based on the second quantity of current-frame representative virtual loudspeakers and the current frame; and encodes the virtual loudspeaker signal to obtain the bitstream.

In another possible embodiment, the encoder obtains a first correlation between the current frame and a set of previous-frame representative virtual loudspeakers; and if the first correlation does not meet a reuse condition, obtains the fourth quantity of coefficients of the current frame of the three-dimensional audio signal and the frequency-domain feature values of the fourth quantity of coefficients. The set of previous-frame representative virtual loudspeakers includes the sixth quantity of virtual loudspeakers. The virtual loudspeaker included in the sixth quantity of virtual loudspeakers is a previous-frame representative virtual loudspeaker used when the previous frame of the three-dimensional audio signal is encoded. The first correlation is used to determine whether the set of previous-frame representative virtual loudspeakers is reused when the current frame is encoded.

In this way, the encoder may first determine whether the set of previous-frame representative virtual loudspeakers can be reused to encode the current frame. If the encoder reuses the set of previous-frame representative virtual loudspeakers to encode the current frame, the encoder does not perform the virtual loudspeaker search procedure. This effectively reduces the calculation complexity of searching for the virtual loudspeaker by the encoder. In this way, the calculation complexity of performing compression coding on the three-dimensional audio signal is reduced, and the calculation load of the encoder is reduced. In addition, the frequent changes of the virtual loudspeakers between the frames may also be reduced, the directional continuity between the frames is enhanced, the spatial image of the reconstructed three-dimensional audio signal is improved, and the sound quality of the reconstructed three-dimensional audio signal is ensured. If the encoder cannot reuse the set of previous-frame representative virtual loudspeakers to encode the current frame, the encoder then selects the representative coefficient, votes on each virtual loudspeaker in the set of candidate virtual loudspeakers by using a representative coefficient of the current frame, and selects the current-frame representative virtual loudspeaker based on the vote value, to achieve purposes of reducing the calculation complexity of performing compression coding on the three-dimensional audio signal and reducing the calculation load of the encoder.

In an embodiment, the encoder may further acquire the current frame of the three-dimensional audio signal, perform compression coding on the current frame of the three-dimensional audio signal to obtain the bitstream, and transmit the bitstream to a decoder side.

According to a second aspect, this application provides a three-dimensional audio signal encoding apparatus. The apparatus includes modules configured to perform the three-dimensional audio signal encoding method according to any one of the first aspect, or possible designs of the first aspect. For example, the three-dimensional audio signal encoding apparatus includes a virtual loudspeaker selection module and an encoding module. The virtual loudspeaker selection module is configured to obtain a first quantity of current-frame initial vote values that are of a first quantity of virtual loudspeakers and that correspond to a current frame of a three-dimensional audio signal. The virtual loudspeakers one-to-one correspond to the current-frame initial vote values. The first quantity of virtual loudspeakers include a first virtual loudspeaker. A current-frame initial vote value of the first virtual loudspeaker indicates a priority of using the first virtual loudspeaker when the current frame is encoded. The virtual loudspeaker selection module is further configured to obtain, based on the first quantity of current-frame initial vote values and a sixth quantity of previous-frame final vote values that are of a sixth quantity of virtual loudspeakers and that correspond to a previous frame of the three-dimensional audio signal, a seventh quantity of current-frame final vote values that are of a seventh quantity of virtual loudspeakers and that correspond to the current frame. The seventh quantity of virtual loudspeakers include the first quantity of virtual loudspeakers, and the seventh quantity of virtual loudspeakers include the sixth quantity of virtual loudspeakers. The virtual loudspeaker selection module is further configured to select a second quantity of current-frame representative virtual loudspeakers from the seventh quantity of virtual loudspeakers based on the seventh quantity of current-frame final vote values. The second quantity is less than the seventh quantity. The encoding module is configured to encode the current frame based on the second quantity of current-frame representative virtual loudspeakers, to obtain a bitstream. These modules may perform corresponding functions in the method example in the first aspect. For details, refer to the detailed descriptions in the method example. Details are not described herein again.

According to a third aspect, this application provides an encoder. The encoder includes at least one processor and a memory. The memory is configured to store a group of computer instructions. When the processor executes the group of computer instructions, operations of the three-dimensional audio signal encoding method according to any one of the first aspect or the possible embodiments of the first aspect are executed.

According to a fourth aspect, this application provides a system. The system includes the encoder according to the third aspect and a decoder. The encoder is configured to perform the operations of the three-dimensional audio signal encoding method according to any one of the first aspect or the possible embodiments of the first aspect. The decoder is configured to decode a bitstream generated by the encoder.

According to a fifth aspect, this application provides a computer-readable storage medium, including computer software instructions. When the computer software instructions are run on an encoder, the encoder is enabled to perform the operations of the method according to any one of the first aspect or the possible embodiments of the first aspect.

According to a sixth aspect, this application provides a computer program product. When the computer program product is run on an encoder, the encoder is enabled to perform the operations of the method according to any one of the first aspect or the possible embodiments of the first aspect.

In this application, based on embodiments according to the foregoing aspects, the embodiments may be further combined to provide more embodiments.

DESCRIPTION OF EMBODIMENTS

Figure 1:
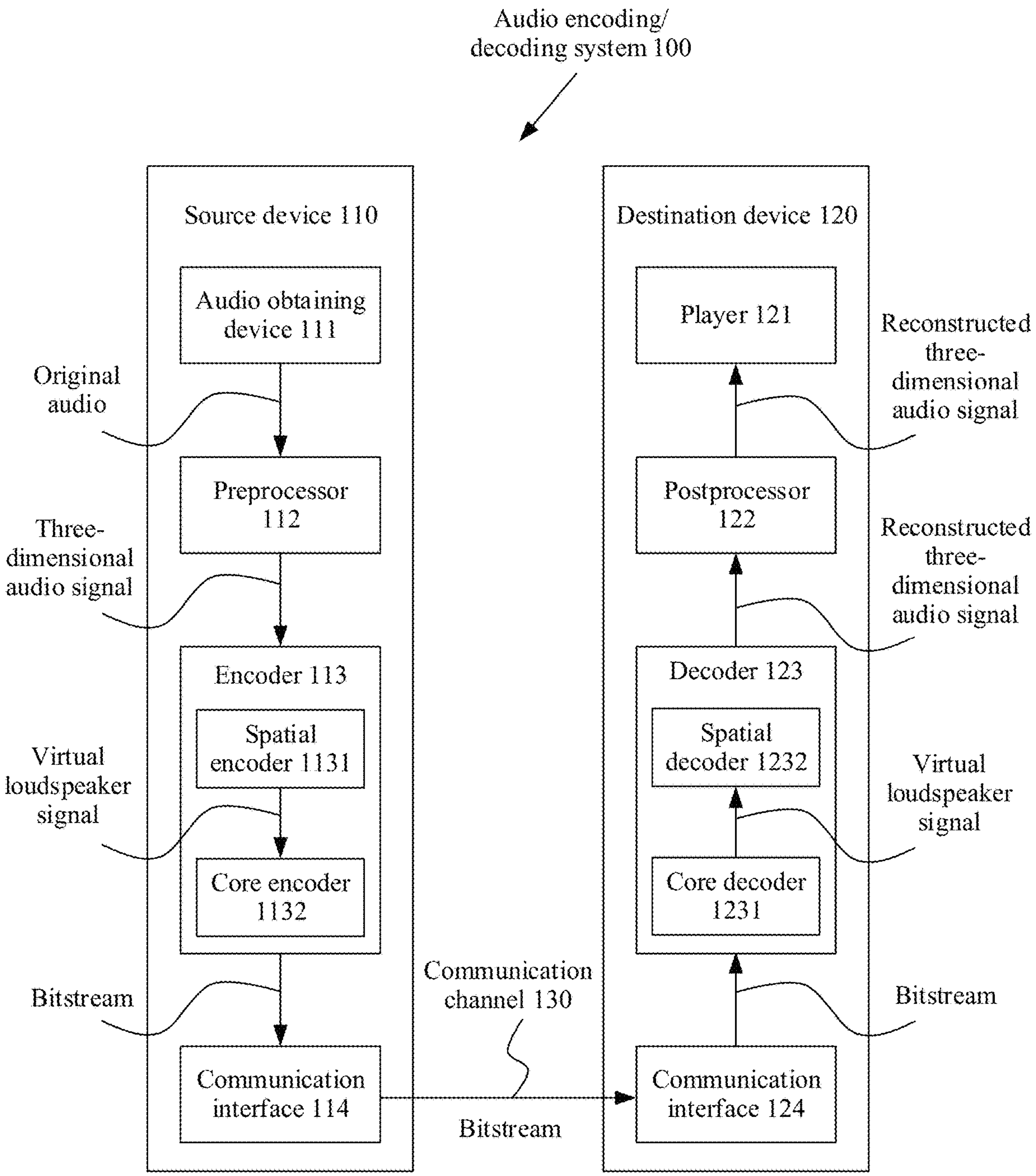
FIG. 1 is a schematic diagram of a structure of an audio encoding/decoding system according to an embodiment of this application.

For clear and brief descriptions of the following embodiments, a related technology is briefly described first.

A sound is a continuous wave generated through vibrations of an object. A vibrating object that generates an acoustic wave is referred to as a sound source. When the acoustic wave propagates through a medium (such as air, a solid or liquid), organs of hearing of humans or animals can perceive the sound.

Characteristics of the acoustic wave include pitch, intensity, and timbre. The pitch indicates how low or high a sound is. The intensity indicates loudness of the sound. The intensity is also referred to as loudness or volume. The intensity is measured in units of decibel (dB). The timbre is also referred to as sound quality.

A frequency of the acoustic wave determines how high or low the pitch is. A high frequency indicates a high pitch. A frequency is a quantity of times per second that an object vibrates. The frequency is measured in units of hertz (Hz). Human ears can hear a sound between 20 Hz and 20,000 Hz.

An amplitude of the acoustic wave determines how strong or weak the intensity is. A great amplitude indicates strong intensity. A close distance to the sound source indicates strong intensity.

Waveforms of the acoustic wave determine the timbre. The waveforms of the acoustic wave include a square wave, a sawtooth wave, a sine wave, and a pulse wave.

Based on the characteristics of the acoustic wave, the sound can be classified into sound generated through regular vibrations and sound generated through irregular vibrations. The sound generated through irregular vibrations is a sound generated when the sound source vibrates irregularly. The sound generated through irregular vibrations is, for example, noise that disrupts people's work, study, and rest. The sound generated through regular vibrations is a sound generated when the sound source vibrates regularly. The sound generated through regular vibrations includes speech and music. When the sound is electrically represented, the sound generated through regular vibrations is an analog signal that varies continuously in time and frequency domains. The analog signal may be referred to as an audio signal. The audio signal is an information carrier carrying speech, music, and sound effect.

Because a person's auditory sense has a capability of distinguishing location distribution of sound sources in space, when hearing a sound in space, the listener can perceive a direction of the sound other than the pitch, the intensity, and the timbre of the sound.

With increasing attention and quality requirements on auditory system experience, to enhance a sense of depth, an immersive sense, and a sense of space of the sound, a three-dimensional audio technology emerges. In this way, the listener not only perceives sounds generated by the sound sources in the front, back, left, and right, but also feels like being surrounded by a spatial sound field ("a sound field" for short) generated by these sound sources. The listener perceives that the sound spreads around. This creates, for the listener, "immersive" sound effect that mimics a cinema or a concert hall scenario.

In the three-dimensional audio technology, it is assumed that space outside human ears is a system, and a signal received at an eardrum is a three-dimensional audio signal output after a sound emitted by a sound source is filtered by the system outside the ear. For example, the system outside the ear may be defined as a system impulse response h(n), any sound source may be defined as x(n), and a signal received at the eardrum is a convolution result of x(n) and h(n). The three-dimensional audio signal according to embodiments of this application is a higher-order ambisonics (HOA) signal. The three-dimensional audio may also be referred to as three-dimensional sound effect, a spatial audio, three-dimensional sound field reconstruction, a virtual 3D audio, a binaural audio, or the like.

It is well known that the acoustic wave is propagated in an ideal medium. A wavenumber is k=w/c, and an angular frequency is w=2πf·f is acoustic wave frequency, and C is a sound speed. A sound pressure P satisfies a formula (1), where $\nabla^2$ is a Laplace operator:

$$\nabla^2 p+k^2 p=0 \quad \text{formula (1)}$$

It is assumed that a space system outside the ear is a sphere. The listener is in the center of the sphere, and a sound from outside of the sphere is projected on a spherical surface. A sound outside the spherical surface is filtered out. It is assumed that sound sources are distributed on the spherical surface, and sound fields generated by the sound sources on the spherical surface are used to fit a sound field generated by an original sound source. That is, the three-dimensional audio technology is a sound field fitting method. Specifically, the equation in the formula (1) is solved in a spherical coordinate system. In a passive spherical region, the equation in the formula (1) is solved as the following formula (2):

$$p(r,\theta,\varphi,k)=s\Sigma_{m=0}^{\infty}(2m+1)j^m j_m^{kr}(kr)\Sigma_{0\le n\le m,\sigma=\pm 1}Y_{m,n}^{\sigma}(\theta_s,\varphi_s)Y_{m,n}^{\sigma}(\theta,\varphi) \quad \text{formula (2)}$$

r represents a sphere radius, θ represents a horizontal angle, φ represents a pitch angle, k represents the wavenumber, S represents an amplitude of an ideal plane wave, and m represents a sequence number of order of a three-dimensional audio signal (or referred to as a sequence number of order of an HOA signal). $j_m j_m^{kr}$ (kr) represents a spherical Bessel function, and the spherical Bessel function is also referred to as a radial basis function. The first j represents an imaginary unit, and (2m+1) $j_m j_m^{kr}$ (kr) does not change with an angle. $Y_{m,n}^{\sigma}$ (θ, φ) represents a spherical harmonic function in θ and φ directions, and $Y_{m,n}^{\sigma}(\theta_s, \varphi_s)$ represents a spherical harmonic function in a direction of a sound source. The three-dimensional audio signal coefficient satisfies a formula (3):

$$B_{m,n}^{\sigma}=s\cdot Y_{m,n}^{\sigma}(\theta_s,\varphi_s) \quad \text{formula (3)}$$

The formula (3) is substituted into the formula (2), and the formula (2) may be transformed into a formula (4):

$$p(r,\theta,\varphi,k)=\sum_{m=0}^{\infty} j_m j_m^{kr}(kr)\sum_{0\le n\le m,\sigma=\pm 1} B_{m,n}^{\sigma} Y_{m,n}^{\sigma}(\theta,\varphi) \quad \text{formula (4)}$$

$B_{m,n}^{\sigma}$ represents a coefficient of an N-order three-dimensional audio signal, and is used to approximately describe the sound field. The sound field is a region in which an acoustic wave exists in a medium. N is an integer greater than or equal to 1. For example, a value of N is an integer in a range of 2 to 6. The coefficient of the three-dimensional audio signal in embodiments of this application may be an HOA coefficient or an ambient stereo (ambisonics) sound coefficient.

The three-dimensional audio signal is an information carrier carrying spatial location information of the sound sources in the sound fields, and describes the sound field of the listener in the space. Formula (4) shows that the sound field may be expanded on the spherical surface according to the spherical harmonic function, that is, the sound field may be decomposed into superposition of a plurality of plane waves. Therefore, the sound field described by the three-dimensional audio signal may be expressed by the superposition of the plurality of plane waves, and the sound field is reconstructed based on the three-dimensional audio signal coefficient.

Compared with a 5.1-channel audio signal or a 7.1-channel audio signal, the N-order HOA signal has $(N+1)^2$ channels. In this way, the HOA signal includes a larger amount of data for describing spatial information of the sound field. If a capturing device (for example, a microphone) transmits the three-dimensional audio signal to a playback device (for example, a loudspeaker), a large bandwidth is consumed. Currently, an encoder may perform compression coding on the three-dimensional audio signal by using spatially squeezed surround audio coding (S3AC) or directional audio coding (DirAC), to obtain a bitstream, and transmit the bitstream to the playback device. The playback device decodes the bitstream, reconstructs the three-dimensional audio signal, and plays the reconstructed three-dimensional audio signal. In this way, a data amount for transmitting the three-dimensional audio signal to the playback device and bandwidth occupation are reduced. However, calculation complexity of performing compression coding on the three-dimensional audio signal by the encoder is high, and excessive computing resources are occupied by the encoder. Therefore, how to reduce the calculation complexity of performing compression coding on the three-dimensional audio signal by the encoder is an urgent problem to be resolved.

Embodiments of this application provide an audio encoding/decoding technology, and in particular, provide a three-dimensional audio encoding/decoding technology for a three-dimensional audio signal. Specifically, an encoding/decoding technology for using fewer audio channels to represent a three-dimensional audio signal is provided, to improve a conventional audio encoding/decoding system. Audio coding (usually referred to as coding) includes audio encoding and audio decoding. The audio encoding is performed on a source side, and usually includes processing (for example, compressing) an original audio to reduce a data amount required for representing the original audio. In this way, the audio is more efficiently stored and/or transmitted. The audio decoding is performed at a destination side, and usually includes inverse processing relative to an encoder, to reconstruct the original audio. Encoding and decoding are also collectively referred to as encoding/decoding. The following describes the implementations of embodiments of this application in detail with reference to accompanying drawings.

FIG. 1 is a schematic diagram of a structure of an audio encoding/decoding system according to an embodiment of this application. The audio encoding/decoding system 100 includes a source device 110 and a destination device 120. The source device 110 is configured to: perform compression coding on a three-dimensional audio signal to obtain a bitstream, and transmit the bitstream to the destination device 120. The destination device 120 decodes the bitstream, reconstructs the three-dimensional audio signal, and plays the reconstructed three-dimensional audio signal.

Specifically, the source device 110 includes an audio obtaining device 111, a preprocessor 112, an encoder 113, and a communication interface 114.

The audio obtaining device 111 is configured to obtain an original audio. The audio obtaining device 111 may be an audio capturing device of any type configured to acquire a sound from the real world, and/or an audio generation device of any type. The audio obtaining device 111 is, for example, a computer audio processor configured to generate a computer audio. The audio obtaining device 111 may alternatively be a memory or a storage of any type that stores an audio. The audio includes the sound from the real world, a sound from a virtual scene (such as VR or augmented reality (AR)), and/or any combination thereof.

The preprocessor 112 is configured to: receive the original audio acquired by the audio obtaining device 111; and pre-process the original audio to obtain the three-dimensional audio signal. For example, preprocessing performed by the preprocessor 112 includes audio channel conversion, audio format conversion, noise reduction, or the like.

The encoder 113 is configured to: receive the three-dimensional audio signal generated by the preprocessor 112; and perform compression coding on the three-dimensional audio signal to obtain the bitstream. For example, the encoder 113 may include a spatial encoder 1131 and a core encoder 1132. The spatial encoder 1131 is configured to: select (or to search for) a virtual loudspeaker from a set of candidate virtual loudspeakers based on the three-dimensional audio signal; and generate a virtual loudspeaker signal based on the three-dimensional audio signal and the virtual loudspeaker. The virtual loudspeaker signal may also be referred to as a playback signal. The core encoder 1132 is configured to encode the virtual loudspeaker signal to obtain the bitstream.

The communication interface 114 is configured to: receive the bitstream generated by the encoder 113; and send the bitstream to the destination device 120 through a communication channel 130, so that the destination device 120 reconstructs the three-dimensional audio signal based on the bitstream.

The destination device 120 includes a player 121, a postprocessor 122, a decoder 123, and a communication interface 124.

The communication interface 124 is configured to: receive the bitstream sent by the communication interface 114; and transmit the bitstream to the decoder 123, so that the decoder 123 reconstructs the three-dimensional audio signal based on the bitstream.

The communication interface 114 and the communication interface 124 may be configured to send or receive data related to the original audio through a direct communication link between the source device 110 and the destination device 120, for example, a direct wired or wireless connection, or through a network of any type, for example, a wired network, a wireless network, or any combination thereof, a private network and a public network of any type, or any combination thereof.

Both the communication interface 114 and the communication interface 124 may be configured as unidirectional communication interfaces as indicated by an arrow for the communication channel 130 in FIG. 1 pointing from the source device 110 to the destination device 120, or bi-directional communication interfaces, and may be configured to, for example, send and receive messages, to establish a connection to acknowledge and exchange any other information related to the communication link and/or data transmission, for example, transmission of the bitstream obtained through encoding.

The decoder 123 is configured to decode the bitstream, and reconstruct the three-dimensional audio signal. For example, the decoder 123 includes a core decoder 1231 and a spatial decoder 1232. The core decoder 1231 is configured to decode the bitstream to obtain the virtual loudspeaker signal. The spatial decoder 1232 is configured to reconstruct the three-dimensional audio signal based on the set of candidate virtual loudspeakers and the virtual loudspeaker signal, to obtain the reconstructed three-dimensional audio signal.

The postprocessor 122 is configured to: receive the reconstructed three-dimensional audio signal generated by the decoder 123; and perform postprocessing on the reconstructed three-dimensional audio signal. For example, the postprocessing performed by the postprocessor 122 includes audio rendering, loudness normalization, user interaction, audio format conversion, noise reduction, or the like.

The player 121 is configured to play the reconstructed sound based on the reconstructed three-dimensional audio signal.

It should be noted that the audio obtaining device 111 and the encoder 113 may be integrated on one physical device, or may be disposed on different physical devices. This is not limited. For example, the source device 110 shown in FIG. 1 includes the audio obtaining device 111 and the encoder 113, indicating that the audio obtaining device 111 and the encoder 113 are integrated on one physical device. In this case, the source device 110 may also be referred to as the capturing device. The source device 110 is, for example, a media gateway of a radio access network, a media gateway of a core network, a transcoding device, a media resource server, an AR device, a VR device, a microphone, or another audio capturing device. If the source device 110 does not include the audio obtaining device 111, this indicates that the audio obtaining device 111 and the encoder 113 are two different physical devices. The source device 110 may obtain the original audio from another device (for example, an audio capturing device or an audio storage device).

In addition, the player 121 and the decoder 123 may be integrated on one physical device, or may be disposed on different physical devices. This is not limited. For example, the destination device 120 shown in FIG. 1 includes the player 121 and the decoder 123, indicating that the player 121 and the decoder 123 are integrated on one physical device. In this case, the destination device 120 may also be referred to as the playback device, and the destination device 120 has functions of decoding and playing the reconstructed audio. The destination device 120 is, for example, a loudspeaker, a headset, or another audio playback device. If the destination device 120 does not include the player 121, this indicates that the player 121 and the decoder 123 are two different physical devices. After decoding the bitstream to reconstruct the three-dimensional audio signal, the destination device 120 transmits the reconstructed three-dimensional audio signal to another playback device (for example, the loudspeaker or the headset). The another playback device plays back the reconstructed three-dimensional audio signal.

In addition, FIG. 1 shows that the source device 110 and the destination device 120 may be integrated on one physical device, or may be disposed on different physical devices. This is not limited.

Figure 2:
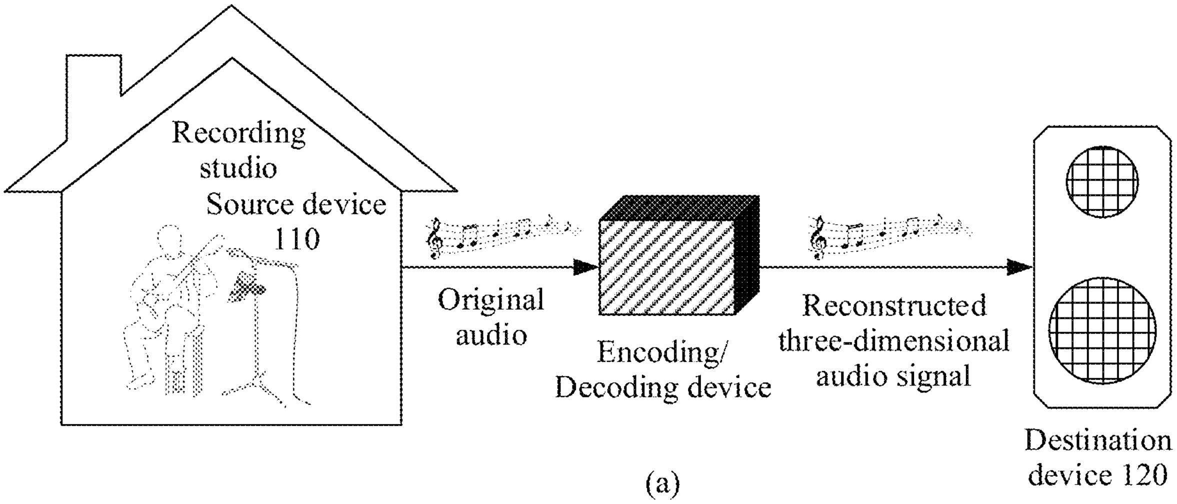
FIG. 2 is a schematic diagram of a scenario of an audio encoding/decoding system according to an embodiment of this application.
Figure 2:
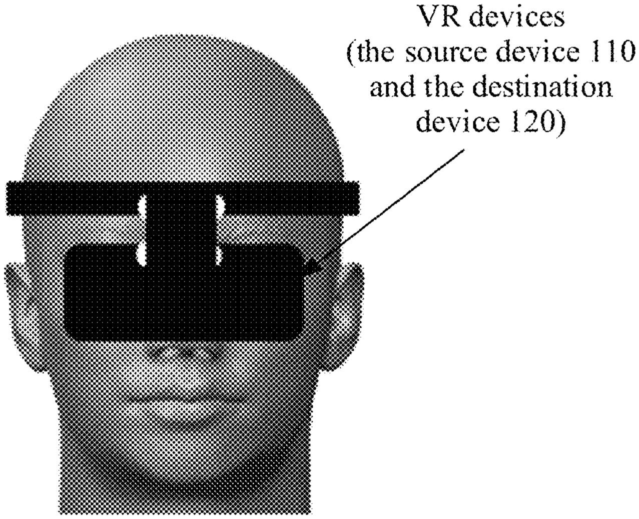

For example, as shown in (a) in FIG. 2, the source device 110 may be a microphone in a recording studio, and the destination device 120 may be a loudspeaker. The source device 110 may acquire original audios of various musical instruments, and transmit the original audios to an encoding/decoding device. The encoding/decoding device encodes/decodes the original audios to obtain the reconstructed three-dimensional audio signal. The destination device 120 plays back the reconstructed three-dimensional audio signal. For another example, the source device 110 may be a microphone in a terminal device, and the destination device 120 may be a headset. The source device 110 may acquire an external sound or an audio synthesized by the terminal device.

For another example, as shown in (b) in FIG. 2, the source device 110 and the destination device 120 are integrated on a virtual reality (VR) device, an augmented reality (AR) device, a mixed reality (MR) device, or an extended reality (XR) device. In this case, the VR/AR/MR/XR device has functions of capturing the original audio, playing back the audio, and encoding/decoding. The source device 110 may acquire a sound generated by a user and a sound generated by a virtual object in a virtual environment in which the user is located.

In these embodiments, the source device 110 or corresponding functions thereof, and the destination device 120 or corresponding functions thereof may be implemented by using same hardware and/or software, or separate hardware and/or software, or any combination thereof. As will be apparent for a skilled person based on the description, the existence and division of different units or functions in the source device 110 and/or the destination device 120 shown in FIG. 1 may vary depending on an actual device and application.

A structure of the audio encoding/decoding system is merely an example for description. In some possible embodiments, the audio encoding/decoding system may further include another device. For example, the audio encoding/decoding system may further include a terminal-side device or a cloud-side device. After capturing the original audio, the source device 110 performs the preprocessing on the original audio to obtain the three-dimensional audio signal, and transmits the three-dimensional audio to the terminal-side device or the cloud-side device, so that the terminal-side device or the cloud-side device encodes/decodes the three-dimensional audio signal.

Figure 3:
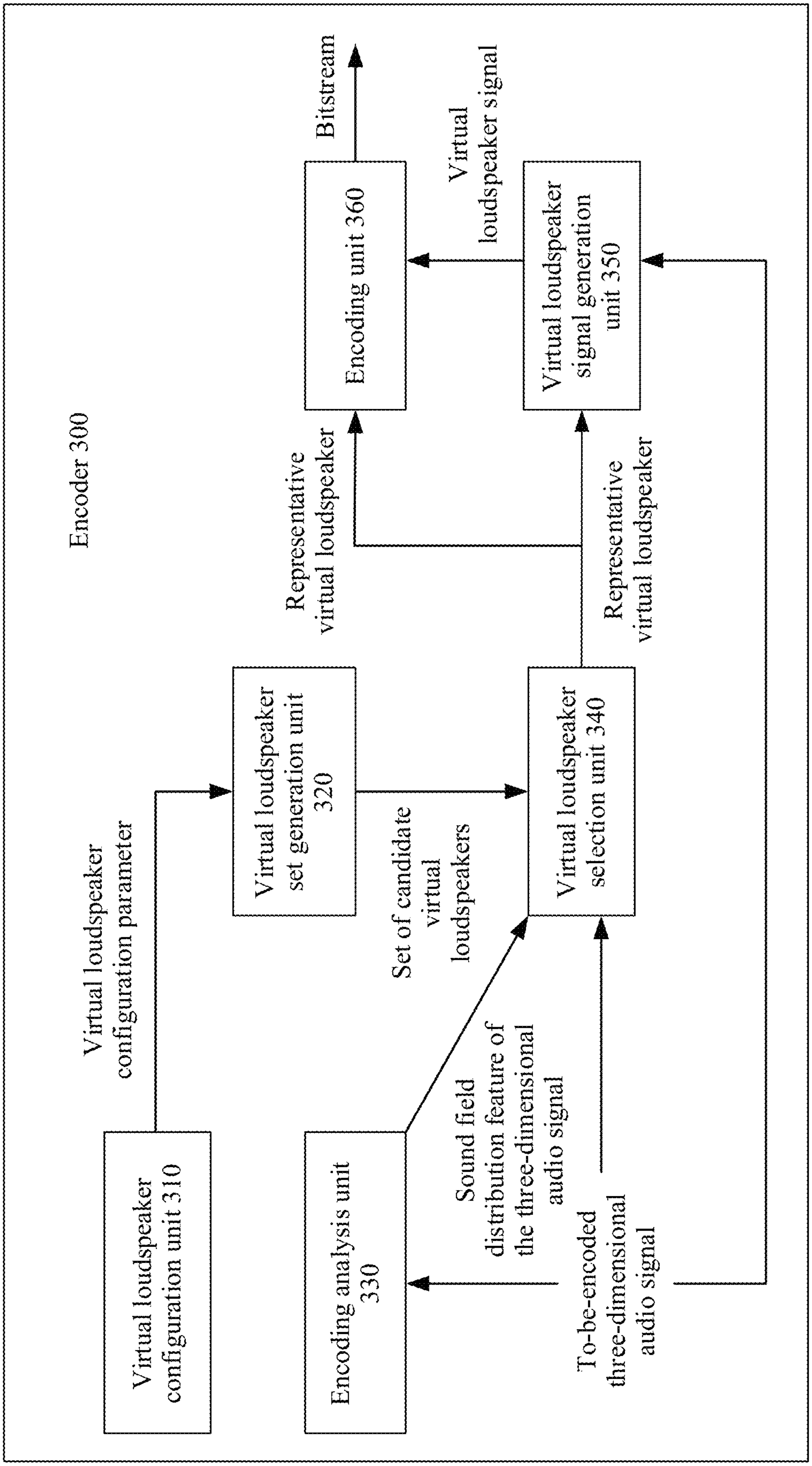
FIG. 3 is a schematic diagram of a structure of an encoder according to an embodiment of this application.

The audio signal encoding/decoding method according to this embodiment of this application is mainly applied to an encoder side. A structure of an encoder is described in detail with reference to FIG. 3. As shown in FIG. 3, the encoder 300 includes a virtual loudspeaker configuration unit 310, a virtual loudspeaker set generation unit 320, an encoding analysis unit 330, a virtual loudspeaker selection unit 340, a virtual loudspeaker signal generation unit 350, and an encoding unit 360.

The virtual loudspeaker configuration unit 310 is configured to generate a virtual loudspeaker configuration parameter based on encoder configuration information, to obtain a plurality of virtual loudspeakers. The encoder configuration information includes but is not limited to: order (or usually referred to as HOA order) of a three-dimensional audio signal, an encoding bit rate, customized information, and the like. The virtual loudspeaker configuration parameter includes but is not limited to a quantity of virtual loudspeakers, order of the virtual loudspeakers, location coordinates of the virtual loudspeakers, and the like. There may be, for example, 2048, 1669, 1343, 1024, 530, 512, 256, 128, or 64 virtual loudspeakers. The order of the virtual loudspeaker may be any one of order 2 to order 6. The location coordinates of the virtual loudspeaker include a horizontal angle and a tilt angle.

The virtual loudspeaker configuration parameter output by the virtual loudspeaker configuration unit 310 is used as an input of the virtual loudspeaker set generation unit 320.

The virtual loudspeaker set generation unit 320 is configured to generate a set of candidate virtual loudspeakers based on the virtual loudspeaker configuration parameter. The set of candidate virtual loudspeakers includes a plurality of virtual loudspeakers. Specifically, the virtual loudspeaker set generation unit 320 determines, based on the quantity of virtual loudspeakers, the plurality of virtual loudspeakers included in the set of candidate virtual loudspeakers, and determines coefficients of the virtual loudspeakers based on location information (for example, coordinates) of the virtual loudspeakers and the order of the virtual loudspeakers. For example, a method for determining virtual loudspeaker coordinates includes but is not limited to: generating a plurality of virtual loudspeakers based on equal distances, or generating, based on an auditory perception principle, a plurality of virtual loudspeakers that are not evenly distributed; and then generating coordinates of the virtual loudspeaker based on the quantity of virtual loudspeakers.

The coefficients of the virtual loudspeakers may alternatively be generated based on a generation principle of the three-dimensional audio signal. $\theta_s$ and $\varphi_s$ in the formula (3) are respectively set as location coordinates of the virtual loudspeaker, and $B_{m,n}^{\sigma}$ represents a coefficient of an N-order virtual loudspeaker. The coefficient of the virtual loudspeaker may also be referred to as an ambisonics coefficient.

The encoding analysis unit 330 is configured to perform encoding analysis on the three-dimensional audio signal, for example, analyze a sound field distribution feature of the three-dimensional audio signal, that is, features such as a quantity of sound sources of the three-dimensional audio signal, directivity of the sound sources, and dispersion of the sound sources.

The coefficients of the plurality of the virtual loudspeakers included in the set of candidate virtual loudspeakers output by the virtual loudspeaker set generation unit 320 are used as an input of the virtual loudspeaker selection unit 340.

The sound field distribution feature that is of the three-dimensional audio signal and that is output by the encoding analysis unit 330 is used as an input of the virtual loudspeaker selection unit 340.

The virtual loudspeaker selection unit 340 is configured to determine, based on a to-be-encoded three-dimensional audio signal, the sound field distribution feature of the three-dimensional audio signal, and the coefficients of the plurality of the virtual loudspeakers, a representative virtual loudspeaker matching the three-dimensional audio signal.

The encoder 300 in this embodiment of this application may not include the encoding analysis unit 330. This is not limited. To be specific, the encoder 300 may not analyze an input signal, and the virtual loudspeaker selection unit 340 determines the representative virtual loudspeaker by using default configuration. For example, the virtual loudspeaker selection unit 340 determines the representative virtual loudspeaker matching the three-dimensional audio signal only based on the three-dimensional audio signal and the coefficients of the plurality of the virtual loudspeakers.

The encoder 300 may use a three-dimensional audio signal obtained from the capturing device or a three-dimensional audio signal synthesized by using an artificial audio object as an input of the encoder 300. In addition, the three-dimensional audio signal input by the encoder 300 may be a time-domain three-dimensional audio signal or a frequency-domain three-dimensional audio signal. This is not limited.

Location information of the representative virtual loudspeaker and a coefficient of the representative virtual loudspeaker that are output by the virtual loudspeaker selection unit 340 are used as inputs of the virtual loudspeaker signal generation unit 350 and the encoding unit 360.

The virtual loudspeaker signal generation unit 350 is configured to generate a virtual loudspeaker signal based on the three-dimensional audio signal and attribute information of the representative virtual loudspeaker. The attribute information of the representative virtual loudspeaker includes at least one of the location information of the representative virtual loudspeaker, the coefficient of the representative virtual loudspeaker, and a coefficient of the three-dimensional audio signal. If the attribute information is the location information of the representative virtual loudspeaker, the coefficient of the representative virtual loudspeaker is determined based on the location information of the representative virtual loudspeaker. If the attribute information includes the coefficient of the three-dimensional audio signal, the coefficient of the representative virtual loudspeaker is obtained based on the coefficient of the three-dimensional audio signal. Specifically, the virtual loudspeaker signal generation unit 350 calculates the virtual loudspeaker signal based on the coefficient of the three-dimensional audio signal and the coefficient of the representative virtual loudspeaker.

For example, it is assumed that a matrix A represents the coefficients of the virtual loudspeakers, and a matrix X represents HOA coefficients of HOA signals. The matrix X is an inverse matrix of the matrix A. A theoretical optimal solution W is obtained by using the least square method, where W represents the virtual loudspeaker signal. The virtual loudspeaker signal satisfies a formula (5):

$$w=A^{-1}X \qquad \text{formula (5)}$$

$A^{-1}$ represents the inverse matrix of the matrix A. A size of the matrix A is (M×C), where C represents a quantity of virtual loudspeakers, M represents a quantity of audio channels of an N-order HOA signal, and a represents a coefficient of the virtual loudspeaker. A size of the matrix X is (M×L), where L represents a quantity of coefficients of the HOA signals, and x represents the coefficient of the HOA signal. The coefficient of the representative virtual loudspeaker may be an HOA coefficient of the representative virtual loudspeaker or an ambisonics coefficient of the representative virtual loudspeaker, for example, $$A = \begin{bmatrix} a_{11} & \cdots & a_{1C} \\ \vdots & \ddots & \vdots \\ a_{M1} & \cdots & a_{MC} \end{bmatrix} \text{ and } X = \begin{bmatrix} X_{11} & \cdots & X_{1L} \\ \vdots & \ddots & \vdots \\ X_{M1} & \cdots & X_{ML} \end{bmatrix}.$$

The virtual loudspeaker signal output by the virtual loudspeaker signal generation unit 350 is used as an input of the encoding unit 360.

The encoding unit 360 is configured to perform core encoding processing on the virtual loudspeaker signal to obtain a bitstream. The core encoding processing includes but is not limited to: transformation, quantization, use of a psychoacoustic model, noise shaping, bandwidth expansion, downmixing, arithmetic coding, bitstream generation, and the like.

It should be noted that, the spatial encoder 1131 may include the virtual loudspeaker configuration unit 310, the virtual loudspeaker set generation unit 320, the encoding analysis unit 330, the virtual loudspeaker selection unit 340, and the virtual loudspeaker signal generation unit 350. In other words, the virtual loudspeaker configuration unit 310, the virtual loudspeaker set generation unit 320, the encoding analysis unit 330, the virtual loudspeaker selection unit 340, and the virtual loudspeaker signal generation unit 350 implement the functions of the spatial encoder 1131. The core encoder 1132 may include the encoding unit 360. In other words, the encoding unit 360 implements the function of the core encoder 1132.

The encoder shown in FIG. 3 may generate one virtual loudspeaker signal, or may generate a plurality of virtual loudspeaker signals. The plurality of the virtual loudspeaker signals may be obtained through a plurality of operations performed by the encoder shown in FIG. 3, or may be obtained through one operation performed by the encoder shown in FIG. 3.

Figure 4:
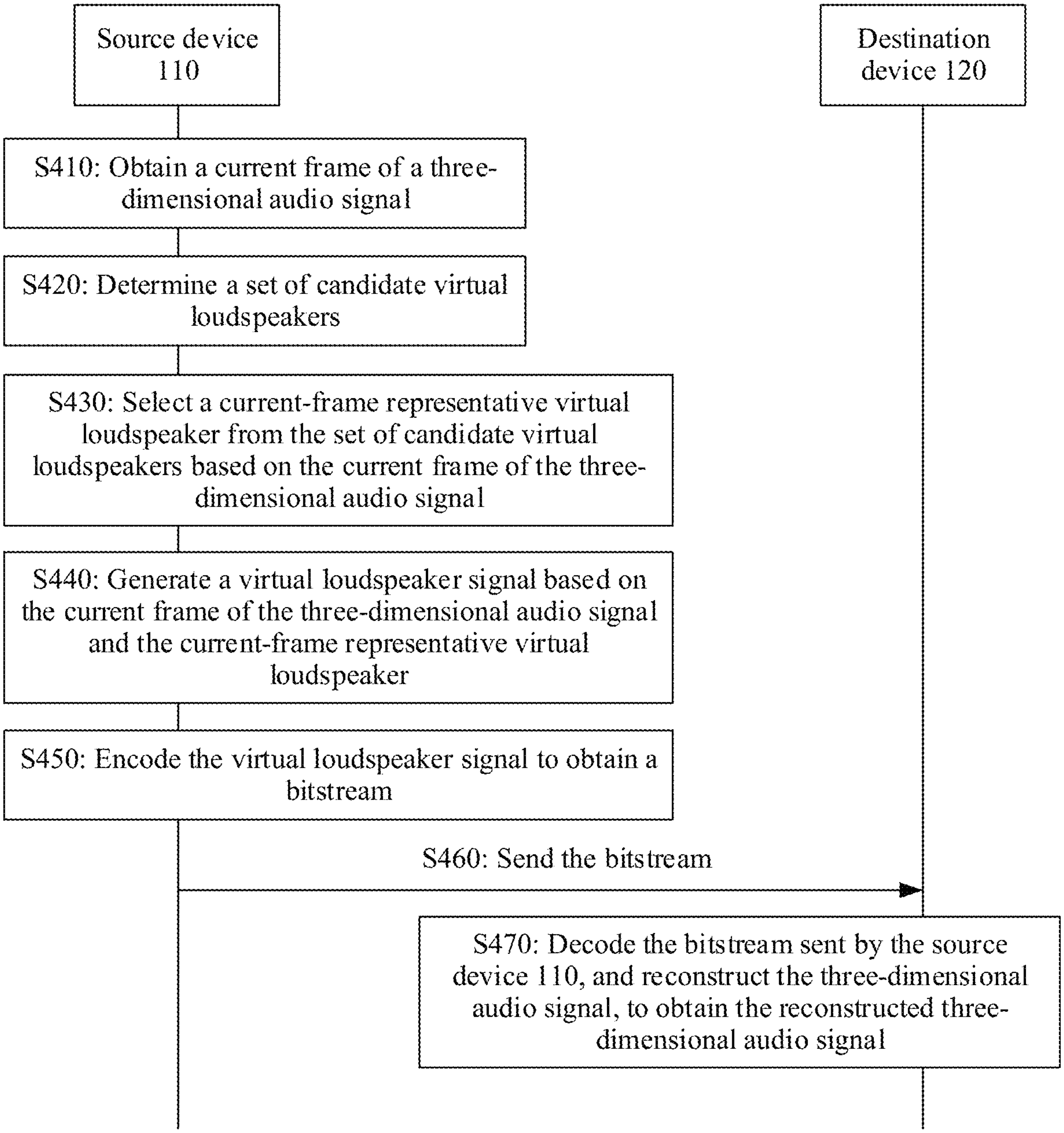
FIG. 4 is a schematic flowchart of a three-dimensional audio signal encoding/decoding method according to an embodiment of this application.

The following describes a three-dimensional audio signal encoding/decoding procedure with reference to accompanying drawings. FIG. 4 is a schematic flowchart of a three-dimensional audio signal encoding/decoding method according to an embodiment of this application. Herein, an example in which the source device 110 and the destination device 120 in FIG. 1 perform the three-dimensional audio signal encoding/decoding procedure is used for description. As shown in FIG. 4, the method includes the following operations.

S410: The source device 110 obtains a current frame of a three-dimensional audio signal.

As described in the foregoing embodiment, if the source device 110 includes the audio obtaining device 111, the source device 110 may acquire an original audio by using the audio obtaining device 111. Optionally, the source device 110 may alternatively receive an original audio acquired by another device, or obtain an original audio from a memory in the source device 110 or another memory. The original audio may include at least one of a sound acquired in real time from the real world, an audio stored in a device, and an audio synthesized from a plurality of audios. A manner of obtaining the original audio and a type of the original audio are not limited in this embodiment.

After obtaining the original audio, the source device 110 generates a three-dimensional audio signal based on a three-dimensional audio technology and the original audio, to provide a listener with "immersive" speaker effect. For a specific method for generating the three-dimensional audio signal, refer to the descriptions of the preprocessor 112 in the foregoing embodiment and the descriptions of a conventional technology.

In addition, an audio signal is a continuous analog signal. In an audio signal processing procedure, the audio signal may be first sampled to generate a digital signal of a frame sequence. A frame may include a plurality of samples. The frame may alternatively be a sample obtained through sampling. The frame may alternatively include subframes obtained by dividing the frame. The frame may alternatively be the subframes obtained by dividing the frame. For example, if a length of a frame is L samples and the frame is divided into N subframes, each subframe corresponds to L/N samples. Audio encoding/decoding generally means to process an audio frame sequence including a plurality of samples.

An audio frame may include a current frame or a previous frame. The current frame or the previous frame described in embodiments of this application may be a frame or a subframe. The current frame is a frame that is being encoded/decoded at a current moment. The previous frame is a frame that has been encoded/decoded at a moment before the current moment. The previous frame may be a frame of a moment before the current moment or frames of a plurality of moments before the current moment. In this embodiment of this application, the current frame of the three-dimensional audio signal is a frame that is of the three-dimensional audio signal and that is being encoded/decoded at the current moment. The previous frame is a frame that is of the three-dimensional audio signal and that has been encoded/decoded before the current moment. The current frame of the three-dimensional audio signal may be a to-be-encoded current frame of the three-dimensional audio signal. The current frame of the three-dimensional audio signal may be referred to as the current frame for short. The previous frame of the three-dimensional audio signal may be referred to as the previous frame for short.

S420: The source device 110 determines a set of candidate virtual loudspeakers.

In one case, a set of candidate virtual loudspeakers is pre-configured in a memory of the source device 110. The source device 110 may read the set of candidate virtual loudspeakers from the memory. The set of candidate virtual loudspeakers includes a plurality of virtual loudspeakers. The virtual loudspeaker indicates a loudspeaker existing virtually in a spatial sound field. The virtual loudspeaker is configured to calculate a virtual loudspeaker signal based on the three-dimensional audio signal, so that the destination device 120 plays back the reconstructed three-dimensional audio signal.

In another case, a virtual loudspeaker configuration parameter is pre-configured in the memory of the source device 110. The source device 110 generates a set of candidate virtual loudspeakers based on the virtual loudspeaker configuration parameter. Optionally, the source device 110 generates the set of candidate virtual loudspeakers in real time based on a capability of a computing resource (for example, a processor) of the source device 110 and a feature (for example, a channel and a data amount) of the current frame.

For a specific method for generating the set of candidate virtual loudspeakers, refer to the conventional technology and the descriptions of the virtual loudspeaker configuration unit 310 and the virtual loudspeaker set generation unit 320 in the foregoing embodiment.

S430: The source device 110 selects a current-frame representative virtual loudspeaker from the set of candidate virtual loudspeakers based on the current frame of the three-dimensional audio signal.

The source device 110 votes on the virtual loudspeakers based on the coefficient of the current frame and the coefficients of the virtual loudspeakers, and selects the current-frame representative virtual loudspeaker from the set of candidate virtual loudspeakers based on vote values of the virtual loudspeakers. The set of candidate virtual loudspeakers is searched for a limited quantity of current-frame representative virtual loudspeakers, and the limited quantity of current-frame representative virtual loudspeakers are used as the best matching virtual loudspeakers for the to-be-encoded current frame. In this way, data compression is performed on the to-be-encoded three-dimensional audio signal.

Figure 5:
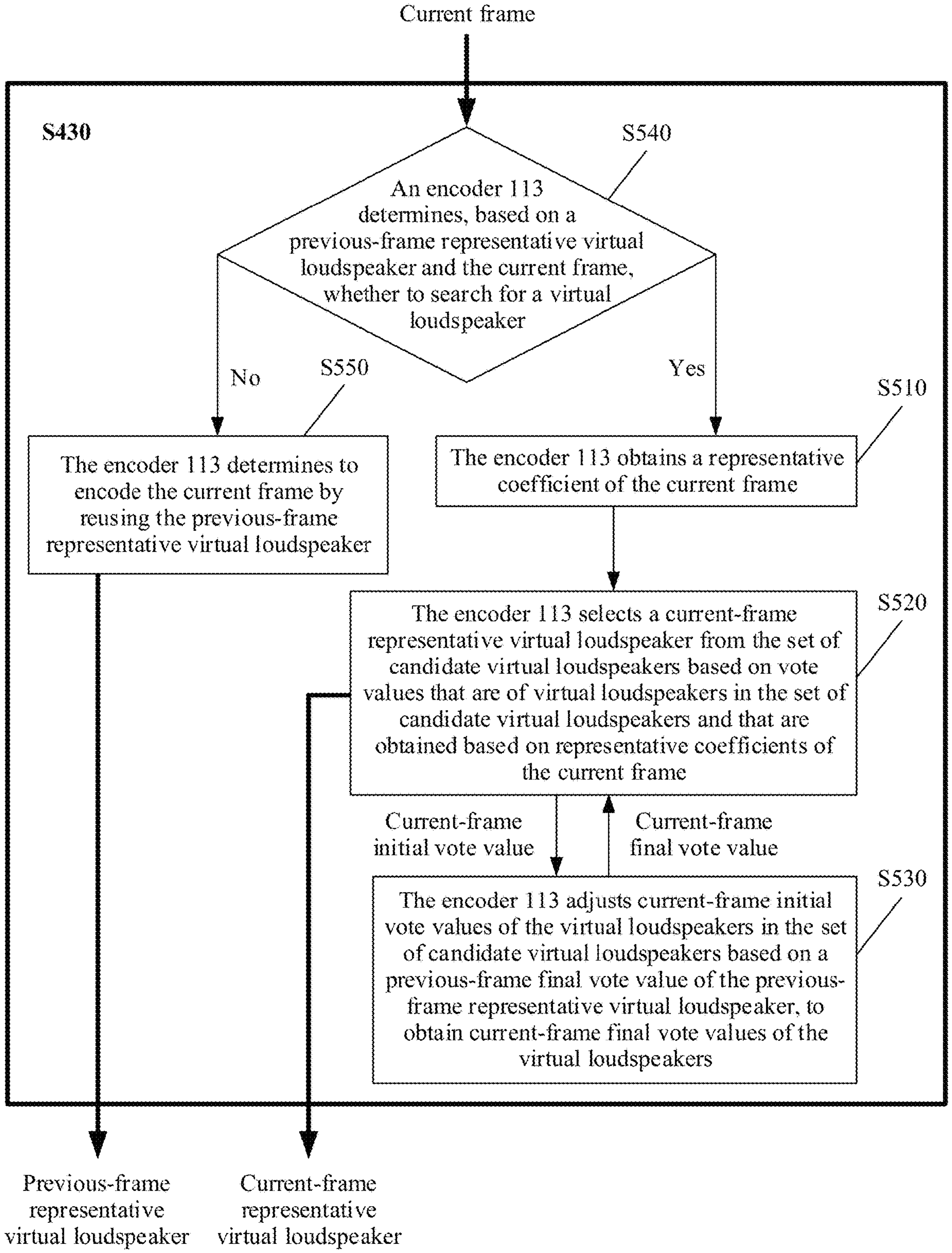
FIG. 5 is a schematic flowchart of a virtual loudspeaker selection method according to an embodiment of this application.

FIG. 5 is a schematic flowchart of a virtual loudspeaker selection method according to an embodiment of this application. The method procedure in FIG. 5 describes a specific operation procedure included in S430 in FIG. 4. Herein, an example in which the encoder 113 in the source device 110 shown in FIG. 1 performs the virtual loudspeaker selection procedure is used for description. Specifically, the function of the virtual loudspeaker selection unit 340 is implemented. As shown in FIG. 5, the method includes the following operations.

S510: The encoder 113 obtains a representative coefficient of the current frame.

The representative coefficient may be a frequency-domain representative coefficient or a time-domain representative coefficient. The frequency-domain representative coefficient may also be referred to as a frequency-domain representative frequency bin or a spectrum representative coefficient. The time-domain representative coefficient may also be referred to as a time-domain representative sample. For a specific method for obtaining the representative coefficient of the current frame, refer to the following descriptions of S6101 and S6102 in FIG. 7.

S520: The encoder 113 selects the current-frame representative virtual loudspeaker from the set of candidate virtual loudspeakers based on the vote values that are of the virtual loudspeakers in the set of candidate virtual loudspeakers and that are obtained based on representative coefficients of the current frame. S440 to S460 are performed.

The encoder 113 votes on the virtual loudspeakers in the set of candidate virtual loudspeakers based on the representative coefficient of the current frame and the coefficients of the virtual loudspeakers, and selects (searches for) the current-frame representative virtual loudspeaker from the set of candidate virtual loudspeakers based on current-frame final vote values of the virtual loudspeakers. For a specific method for selecting the current-frame representative virtual loudspeaker, refer to the descriptions of FIGS. 8 and S6103 in FIG. 7.

It should be noted that the encoder first traverses the virtual loudspeakers included in the set of candidate virtual loudspeakers, and compresses the current frame by using the current-frame representative virtual loudspeaker that is selected from the set of candidate virtual loudspeakers. However, if selection results of the virtual loudspeakers for consecutive frames differ greatly, a spatial image of the reconstructed three-dimensional audio signal is unstable, and sound quality of the reconstructed three-dimensional audio signal is reduced. In this embodiment of this application, the encoder 113 may update, based on a previous-frame final vote value of the previous-frame representative virtual loudspeaker, current-frame initial vote values of the virtual loudspeakers included in the set of candidate virtual loudspeakers, to obtain current-frame final vote values of the virtual loudspeakers, and then select the current-frame representative virtual loudspeaker from the set of candidate virtual loudspeakers based on the current-frame final vote values of the virtual loudspeakers. In this way, the current-frame representative virtual loudspeaker is selected based on the previous-frame representative virtual loudspeaker, so that when selecting the current-frame representative virtual loudspeaker for the current frame, the encoder tends to select a virtual loudspeaker that is the same as the previous-frame representative virtual loudspeaker. In this way, directional continuity between the consecutive frames is increased, and a problem that selection results of the virtual loudspeakers for the consecutive frames differ greatly is resolved. Therefore, this embodiment of this application may further include S530.

S530: The encoder 113 adjusts the current-frame initial vote values of the virtual loudspeakers in the set of candidate virtual loudspeakers based on the previous-frame final vote value of the previous-frame representative virtual loudspeaker, to obtain the current-frame final vote values of the virtual loudspeakers.

The encoder 113 votes on the virtual loudspeakers in the set of candidate virtual loudspeakers based on the representative coefficient of the current frame and the coefficients of the virtual loudspeakers, to obtain the current-frame initial vote values of the virtual loudspeakers, and then adjusts the current-frame initial vote values of the virtual loudspeaker in the set of candidate virtual loudspeakers based on the previous-frame final vote value of the previous-frame representative virtual loudspeaker, to obtain the current-frame final vote values of the virtual loudspeakers. The previous-frame representative virtual loudspeaker is a virtual loudspeaker used when the encoder 113 encodes the previous frame. For a specific method for adjusting the current-frame initial vote values of the virtual loudspeakers in the set of candidate virtual loudspeakers, refer to the following descriptions of S620 and S630 in FIGS. 6 and S810 to S840 in FIG. 8.

In some embodiments, if the current frame is a first frame in the original audio, the encoder 113 performs S510 and S520. If the current frame is any frame following a second frame in the original audio, the encoder 113 may first determine whether the previous-frame representative virtual loudspeaker is reused to encode the current frame or determine whether to search for a virtual loudspeaker, to ensure the directional continuity between the consecutive frames and reduce encoding complexity. This embodiment of this application may further include S5540.

S5540: The encoder 113 determines, based on the previous-frame representative virtual loudspeaker and the current frame, whether to search for the virtual loudspeaker.

If the encoder 113 determines to search for the virtual loudspeaker, S510 to S530 are performed. Optionally, the encoder 113 may first perform S510. To be specific, the encoder 113 obtains the representative coefficient of the current frame. The encoder 113 determines, based on the representative coefficient of the current frame and a coefficient of the previous-frame representative virtual loudspeaker, whether to search for the virtual loudspeaker. If the encoder 113 determines to search for the virtual loudspeaker, S520 and S530 are performed.

If the encoder 113 determines not to search for the virtual loudspeaker, S550 is performed.

S5550: The encoder 113 determines to encode the current frame by reusing the previous-frame representative virtual loudspeaker.

The encoder 113 generates a virtual loudspeaker signal based on the current frame by reusing the previous-frame representative virtual loudspeaker, encodes the virtual loudspeaker signal to obtain a bitstream, and sends the bitstream to the destination device 120. In other words, S450 and S460 are performed.

Figure 9:
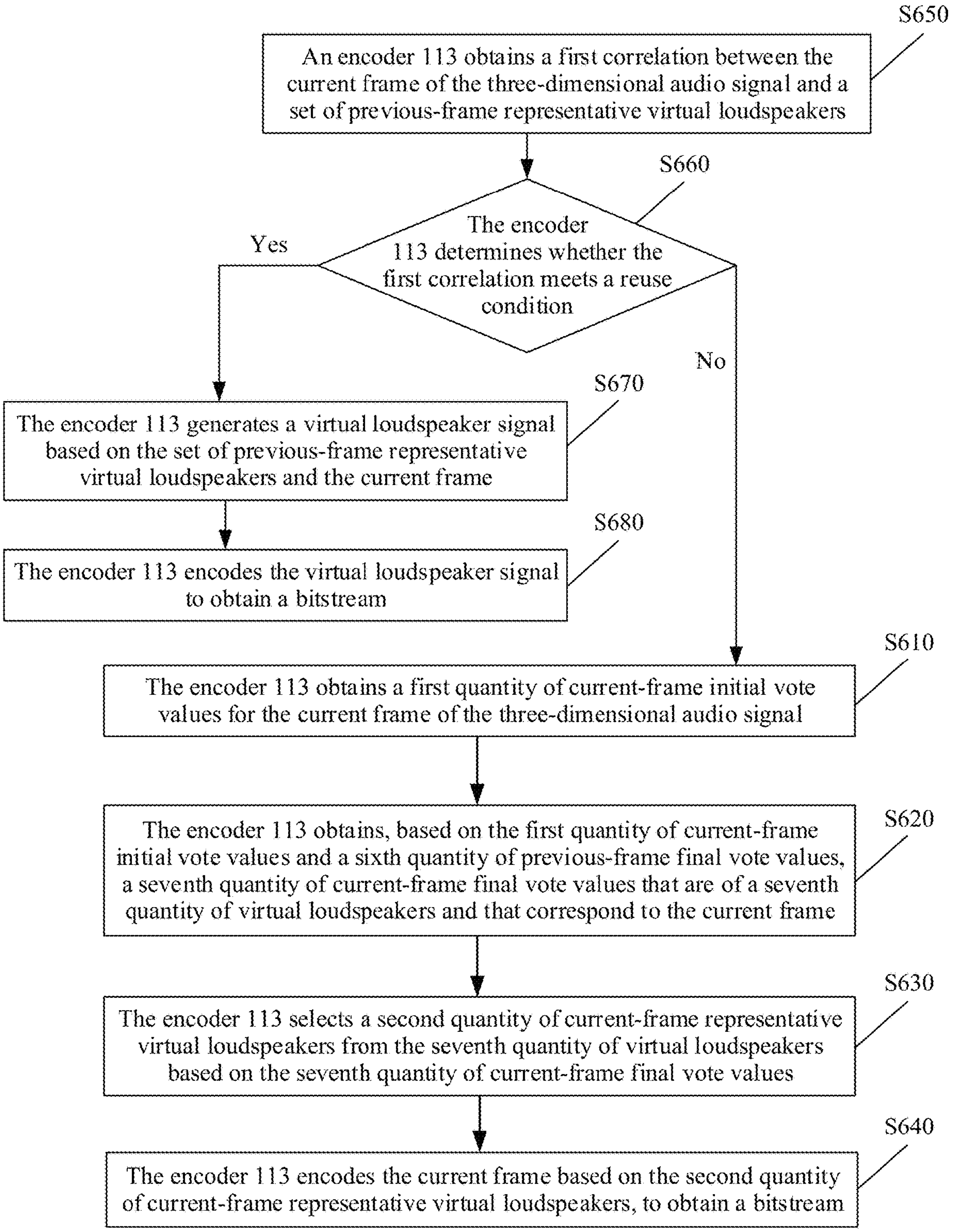
FIG. 9 is a schematic flowchart of another virtual loudspeaker selection method according to an embodiment of this application.

For a specific method for determining whether to search for the virtual loudspeaker, refer to the following descriptions of S650 to S680 in FIG. 9.

S5440: The source device 110 generates a virtual loudspeaker signal based on the current frame of the three-dimensional audio signal and the current-frame representative virtual loudspeaker.

The source device 110 generates the virtual loudspeaker signal based on the coefficient of the current frame and the coefficient of the current-frame representative virtual loudspeaker. For a specific method for generating the virtual loudspeaker signal, refer to the conventional technology and the descriptions of the virtual loudspeaker signal generation unit 350 in the foregoing embodiment.

S5450: The source device 110 encodes the virtual loudspeaker signal to obtain a bitstream.

The source device 110 may perform an encoding operation such as transformation or quantization on the virtual loudspeaker signal to generate the bitstream. In this way, data compression is performed on the to-be-encoded three-dimensional audio signal. For a specific method for generating the bitstream, refer to the conventional technology and the descriptions of the encoding unit 360 in the foregoing embodiment.

S460: The source device 110 sends the bitstream to the destination device 120.

After encoding all the original audio, the source device 110 may send the bitstream of the original audio to the destination device 120. Alternatively, the source device 110 may alternatively encode the three-dimensional audio signal in real time frame by frame, and send a bitstream of one frame after encoding the frame. For a specific method for sending the bitstream, refer to the conventional technology and the descriptions of the communication interface 114 and the communication interface 124 in the foregoing embodiment.

S470: The destination device 120 decodes the bitstream sent by the source device 110, and reconstructs the three-dimensional audio signal, to obtain the reconstructed three-dimensional audio signal.

After receiving the bitstream, the destination device 120 decodes the bitstream to obtain the virtual loudspeaker signal, and then reconstructs the three-dimensional audio signal based on the set of candidate virtual loudspeakers and the virtual loudspeaker signal to obtain the reconstructed three-dimensional audio signal. The destination device 120 plays back the reconstructed three-dimensional audio signal. Alternatively, the destination device 120 transmits the reconstructed three-dimensional audio signal to another playback device, and the another playback device plays the reconstructed three-dimensional audio signal. In this way, "immersive" sound effect that mimics a scenario such as a cinema, a concert hall, or a virtual scene for the listener is more vivid.

Figure 6:
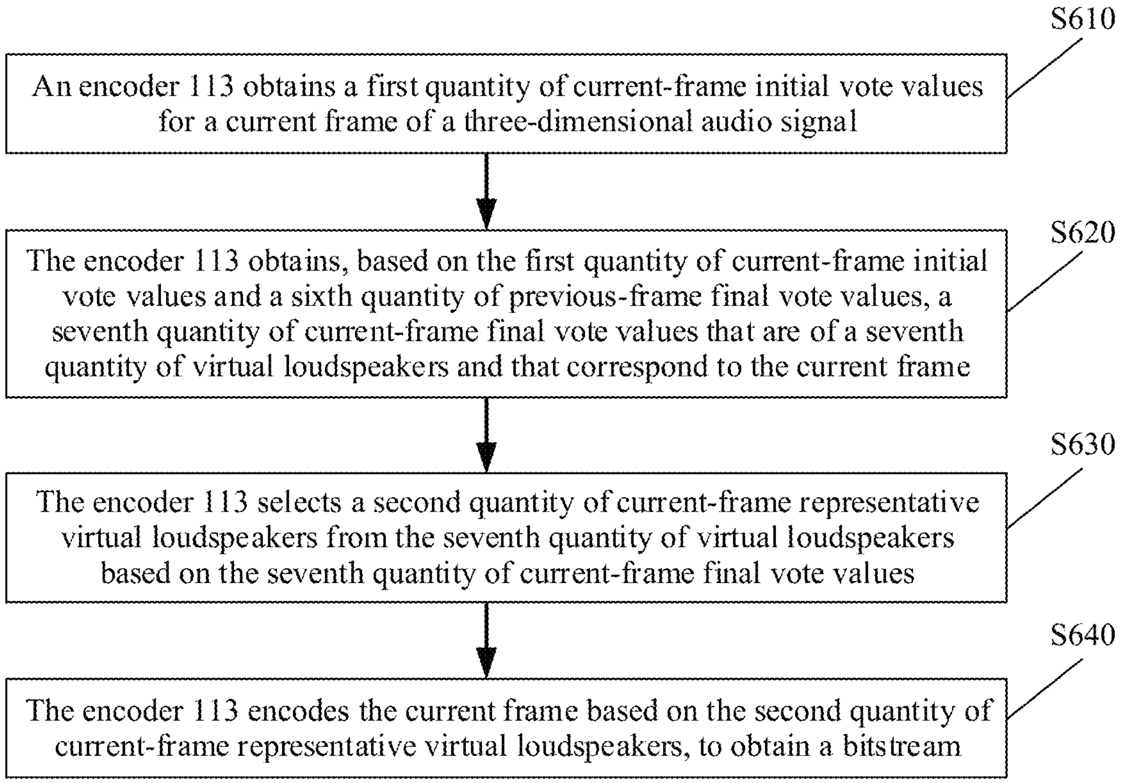
FIG. 6 is a schematic flowchart of a three-dimensional audio signal encoding method according to an embodiment of this application.

To increase the directional continuity between the consecutive frames and resolve the problem that the selection results of the virtual loudspeakers for the consecutive frames differ greatly, the encoder 113 adjusts the current-frame initial vote values of the virtual loudspeakers in the set of candidate virtual loudspeakers based on the previous-frame final vote value of the previous-frame representative virtual loudspeaker, to obtain the current-frame final vote values of the virtual loudspeakers. FIG. 6 is a schematic flowchart of another virtual loudspeaker selection method according to an embodiment of this application. Herein, an example in which the encoder 113 in the source device 110 in FIG. 1 performs the virtual loudspeaker selection procedure is used for description. The method procedure in FIG. 6 describes a specific operation procedure included in S530 in FIG. 5. As shown in FIG. 6, the method includes the following operations.

S610: The encoder 113 obtains a first quantity of current-frame initial vote values for a current frame of a three-dimensional audio signal.

The encoder 113 may vote on each virtual loudspeaker in the set of candidate virtual loudspeakers by using the representative coefficient of the current frame, to obtain a current-frame initial vote value of the virtual loudspeaker, and select the current-frame representative virtual loudspeaker based on the vote value. In this way, the calculation complexity of searching for the virtual loudspeaker is reduced, and the calculation load of the encoder is reduced.

Figure 7:
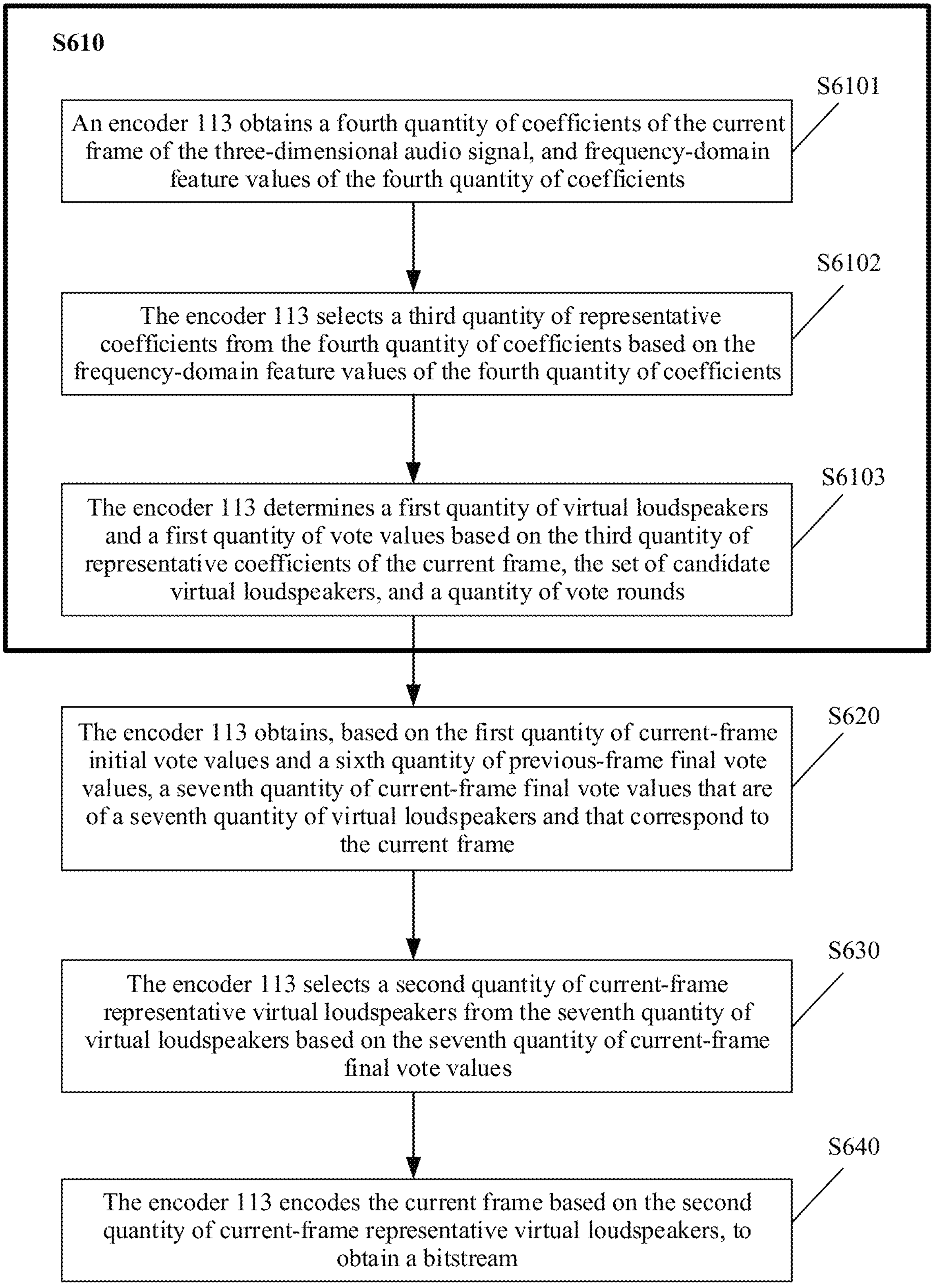
FIG. 7 is a schematic flowchart of another virtual loudspeaker selection method according to an embodiment of this application.

FIG. 7 is a schematic flowchart of another three-dimensional audio signal encoding method according to an embodiment of this application. Herein, an example in which the encoder 113 in the source device 110 in FIG. 1 performs the virtual loudspeaker selection procedure is used for description. The method procedure in FIG. 7 describes specific operation procedures included in S510 and S520 in FIG. 5. As shown in FIG. 7, the method includes the following operations.

S6101: The encoder 113 obtains a fourth quantity of coefficients of the current frame of the three-dimensional audio signal, and frequency-domain feature values of the fourth quantity of coefficients.

It is assumed that the three-dimensional audio signal is an HOA signal. The encoder 113 may sample a current frame of the HOA signal to obtain $L\times(N+1)^2$ samples, that is, obtain the fourth quantity of coefficients. N indicates order of the HOA signal. For example, it is assumed that duration of the current frame of the HOA signal is 20 milliseconds. The encoder 113 samples the current frame based on frequency of 48 kHz, to obtain $960\times(N+1)^2$ samples in a time-domain. The sample may also be referred to as a time-domain coefficient.

A frequency-domain coefficient of the current frame of the three-dimensional audio signal may be obtained by performing a time-frequency transform based on the time-domain coefficient of the current frame of the three-dimensional audio signal. A method for transforming a time-domain into a frequency-domain is not limited. A method for transforming the time-domain into the frequency-domain includes, for example, obtaining $960\times(N+1)^2$ frequency-domain coefficients in the frequency-domain by using a modified discrete cosine transform (MDCT). The frequency-domain coefficient may also be referred to as a spectrum coefficient or a frequency bin.

A frequency-domain feature value of the sample satisfies $p(j)=norm(x(j))$, where j=1, 2, . . . , and L. L represents a quantity of sampling moments, x represents the frequency-domain coefficient of the current frame of the three-dimensional audio signal, for example, an MDCT coefficient, norm is an operation of obtaining a 2-norm, and x(j) represents a frequency-domain coefficient of $(N+1)^2$ samples at a $j^{th}$ sampling moment.

S6102: The encoder 113 selects a third quantity of representative coefficients from the fourth quantity of coefficients based on the frequency-domain feature values of the fourth quantity of coefficients.

The encoder 113 divides a spectrum range indicated by the fourth quantity of coefficients into at least one subband. The encoder 113 divides the spectrum range indicated by the fourth quantity of coefficients into one subband. It may be understood that a spectrum range of the subband is equal to the spectrum range indicated by the fourth quantity of coefficients, that is, the encoder 113 does not divide the spectrum range indicated by the fourth quantity of coefficients.

If the encoder 113 divides the spectral range indicated by the fourth quantity of coefficients into at least two frequency subbands, in one case, the encoder 113 equally divides the spectral range indicated by the fourth quantity of coefficients into at least two subbands. Each of the at least two subbands includes a same quantity of coefficients.

In another case, the encoder 113 unequally divides the spectrum range indicated by the fourth quantity of coefficients. Quantities of coefficients included in at least two subbands obtained through division are different, or quantities of coefficients included in each of the at least two subbands obtained through division are different. For example, the encoder 113 may unequally divide, based on a low frequency range, an intermediate frequency range, and a high frequency range in the spectrum range indicated by the fourth quantity of coefficients, the spectrum range indicated by the fourth quantity of coefficients, so that each spectrum range in the low frequency range, the intermediate frequency range, and the high frequency range includes at least one subband. Each of the at least one subband in the low frequency range includes a same quantity of coefficients. Each of the at least one subband in the intermediate frequency range includes a same quantity of coefficients. Each of the at least one subband in the high frequency range includes a same quantity of coefficients. Subbands in the three spectrum ranges of the low frequency range, the intermediate frequency range, and the high frequency range may include different quantities of coefficients.

Further, the encoder 113 selects, based on the frequency-domain feature values of the fourth quantity of coefficients, representative coefficients from the at least one subband included in the spectrum range indicated by the fourth quantity of coefficients, to obtain the third quantity of representative coefficients. The third quantity is less than the fourth quantity, and the fourth quantity of coefficients include the third quantity of representative coefficients.

For example, the encoder 113 selects Z representative coefficients from each subband based on a descending order of frequency-domain feature values of the coefficients in each of the at least one subband included in the spectrum range indicated by the fourth quantity of coefficients, and combines the Z representative coefficients in the at least one subband to obtain the third quantity of representative coefficients, where Z is a positive integer.

For another example, when the at least one subband includes at least two sub-bands, the encoder 113 determines a weight of each subband based on a frequency-domain feature value of a first candidate coefficient in each subband of the at least two subbands, and adjusts a frequency-domain feature value of a second candidate coefficient in each subband based on the weight of each subband, to obtain an adjusted frequency-domain feature value of the second candidate coefficient in each subband. The first candidate coefficient and the second candidate coefficient are some of the coefficients in the subband. The encoder 113 determines the third quantity of representative coefficients based on adjusted frequency-domain feature values of second candidate coefficients in the at least two subbands and a frequency-domain feature value of a coefficient other than the second candidate coefficients in the at least two subbands.

Because the encoder selects some coefficients from all coefficients of the current frame as representative coefficients, and replaces all coefficients of the current frame with the small quantity of representative coefficients to select the representative virtual loudspeaker from the set of candidate virtual loudspeakers, the calculation complexity of searching for the virtual loudspeaker by the encoder is effectively reduced. In this way, the calculation complexity of performing compression coding on the three-dimensional audio signal is reduced, and the calculation load of the encoder is reduced.

S6103: The encoder 113 determines a first quantity of virtual loudspeakers and a first quantity of vote values based on the third quantity of representative coefficients of the current frame, the set of candidate virtual loudspeakers, and a quantity of vote rounds.

The quantity of vote rounds is used to limit a quantity of times of voting on the virtual loudspeakers. The quantity of vote rounds is an integer greater than or equal to 1. The quantity of vote rounds is less than or equal to a quantity of virtual loudspeakers included in the set of candidate virtual loudspeakers, and the quantity of vote rounds is less than or equal to the quantity of virtual loudspeaker signals transmitted by the encoder. For example, the set of candidate virtual loudspeakers includes a fifth quantity of virtual loudspeakers. The fifth quantity of virtual loudspeakers include the first quantity of virtual loudspeakers. The first quantity is less than or equal to the fifth quantity. The quantity of vote rounds is an integer greater than or equal to 1, and the quantity of vote rounds is less than or equal to the fifth quantity. The virtual loudspeaker signal may alternatively be a transport channel of the current-frame representative virtual loudspeaker corresponding to the current frame. Generally, a quantity of virtual loudspeaker signals is less than or equal to a quantity of virtual loudspeakers.

In a possible embodiment, the quantity of vote rounds may be pre-configured, or may be determined based on a computing capability of the encoder. For example, the quantity of vote rounds is determined based on an encoding rate and/or an encoding application scenario of the encoder.

In another possible embodiment, the quantity of vote rounds is determined based on a quantity of directional sound sources in the current frame. For example, when the quantity of directional sound sources in the sound field is 2, the quantity of vote rounds is set to 2.

This embodiment of this application provides three possible embodiments of determining the first quantity of virtual loudspeakers and the first quantity of vote values. The following separately describes the three manners in detail.

In a first possible embodiment, the quantity of vote rounds is equal to 1. After obtaining a plurality of representative coefficients through sampling, the encoder 113 obtains vote values that are of all virtual loudspeakers in the set of candidate virtual loudspeakers and that are obtained based on each representative coefficient of the current frame, and accumulates vote values of virtual loudspeakers with a same serial number, to obtain the first quantity of virtual loudspeakers and the first quantity of vote values. It may be understood that the set of candidate virtual loudspeakers includes the first quantity of virtual loudspeakers. The first quantity is equal to a quantity of virtual loudspeakers included in the set of candidate virtual loudspeakers. It is assumed that the set of candidate virtual loudspeakers includes the fifth quantity of virtual loudspeakers. The first quantity is equal to the fifth quantity. The first quantity of vote values include the vote values of all virtual loudspeakers in the set of candidate virtual loudspeakers. The encoder 113 may use the first quantity of vote values as current-frame initial vote values of the first quantity of virtual loudspeakers. S620 to S640 are performed.

The virtual loudspeakers one-to-one correspond to the vote values, that is, one virtual loudspeaker corresponds to one vote value. For example, the first quantity of virtual loudspeakers include a first virtual loudspeaker. The first quantity of vote values include a vote value of the first virtual loudspeaker. The first virtual loudspeaker corresponds to the vote value of the first virtual loudspeaker. The vote value of the first virtual loudspeaker indicates a priority of using the first virtual loudspeaker when the current frame is encoded. The priority may alternatively be described as a preference. To be specific, the vote value of the first virtual loudspeaker indicates the preference of using the first virtual loudspeaker when the current frame is encoded. It may be understood that a larger vote value of the first virtual loudspeaker indicates a higher priority or a higher preference of the first virtual loudspeaker. The encoder 113 tends to select the first virtual loudspeaker than a virtual loudspeaker that is in the set of candidate virtual loudspeakers and that has a smaller vote value than the first virtual loudspeaker, to encode the current frame.

In a second possible embodiment, a difference from the foregoing first possible embodiment lies in that, after obtaining the vote values that are of all virtual loudspeakers in the set of candidate virtual loudspeakers and that are obtained based on each representative coefficient of the current frame, the encoder 113 selects some vote values from the vote values that are of all virtual loudspeakers in the set of candidate virtual loudspeakers and that are obtained based on each representative coefficient of the current frame, and accumulates vote values of virtual loudspeakers that are in virtual loudspeakers corresponding to the some vote values and that have a same serial number, to obtain the first quantity of virtual loudspeakers and the first quantity of vote values. It may be understood that the set of candidate virtual loudspeakers includes the first quantity of virtual loudspeakers. The first quantity is less than or equal to a quantity of virtual loudspeakers included in the set of candidate virtual loudspeakers. The first quantity of vote values include vote values of some virtual loudspeakers included in the set of candidate virtual loudspeakers, or the first quantity of vote values include the vote values of all virtual loudspeakers included in the set of candidate virtual loudspeakers.

In the third possible embodiment, a difference from the foregoing second possible embodiment lies in that the quantity of vote rounds is an integer greater than or equal to 2. For each representative coefficient of the current frame, the encoder 113 performs at least two rounds of voting on all virtual loudspeakers in the set of candidate virtual loudspeakers, and selects a virtual loudspeaker with a maximum vote value in each round. After at least two rounds of voting are performed on all virtual loudspeakers based on each representative coefficient of the current frame, the vote values of the virtual loudspeakers with the same serial number are accumulated, to obtain the first quantity of virtual loudspeakers and the first quantity of vote values.

S620: The encoder 113 obtains, based on the first quantity of current-frame initial vote values and a sixth quantity of previous-frame final vote values, a seventh quantity of current-frame final vote values that are of a seventh quantity of virtual loudspeakers and that correspond to the current frame.

According to the method in S610, the encoder 113 may determine the first quantity of virtual loudspeakers and the first quantity of vote values based on the current frame of the three-dimensional audio signal, the set of candidate virtual loudspeakers, and the quantity of vote rounds, and then use the first quantity of vote values as the current-frame initial vote values of the first quantity of virtual loudspeakers.

The virtual loudspeakers one-to-one correspond to the current-frame initial vote values, that is, one virtual loudspeaker corresponds to one current-frame initial vote value. For example, the first quantity of virtual loudspeakers include a first virtual loudspeaker. The first quantity of current-frame initial vote values include a current-frame initial vote value of the first virtual loudspeaker. The first virtual loudspeaker corresponds to the current-frame initial vote value of the first virtual loudspeaker. The current-frame initial vote value of the first virtual loudspeaker indicates a priority of using the first virtual loudspeaker when the current frame is encoded.

A sixth quantity of virtual loudspeakers may be previous-frame representative virtual loudspeakers used by the encoder 113 to encode the previous frame of the three-dimensional audio signal. In S650, when the encoder 113 obtains a first correlation between the current frame of the three-dimensional audio signal and the set of previous-frame representative virtual loudspeakers. The set of previous-frame representative virtual loudspeakers includes the sixth quantity of virtual loudspeakers.

In an embodiment, the encoder 113 updates the first quantity of current-frame initial vote values based on a sixth quantity of previous-frame final vote values. To be specific, the encoder 113 calculates a sum of current-frame initial vote values and previous-frame final vote values of virtual loudspeakers that are in the first quantity of virtual loudspeakers and the sixth quantity of virtual loudspeakers and that have the same serial number, to obtain the seventh quantity of current-frame final vote values that are of the seventh quantity of virtual loudspeakers and that correspond to the current frame.

In a first possible case, the first quantity of virtual loudspeakers include the sixth quantity of virtual loudspeakers. The first quantity is equal to the sixth quantity. Serial numbers of the first quantity of virtual loudspeakers and serial numbers of the sixth quantity of virtual loudspeakers are the same. It may be understood that the first quantity of virtual loudspeakers obtained by the encoder 113 are the sixth quantity of virtual loudspeakers, and the previous-frame final vote values of the sixth quantity of virtual loudspeakers are the previous-frame final vote values of the first quantity of virtual loudspeakers. The encoder 113 may update the current-frame initial vote values of the first quantity of virtual loudspeakers based on the previous-frame final vote values of the sixth quantity of virtual loudspeakers. For example, the seventh quantity of virtual loudspeakers are also the first quantity of virtual loudspeakers. The seventh quantity of current-frame final vote values are a sum of the previous-frame final vote values of the first quantity of virtual loudspeakers and the current-frame initial vote values of the first quantity of virtual loudspeakers.

For example, it is assumed that the sixth quantity of virtual loudspeakers include the first virtual loudspeaker, the first quantity of virtual loudspeakers include the first virtual loudspeaker, and the sixth quantity of virtual loudspeakers and the first quantity of virtual loudspeakers do not include another virtual loudspeaker. The encoder 113 may update the current-frame initial vote value of the first virtual loudspeaker based on a previous-frame final vote value of the first virtual loudspeaker, to obtain a current-frame final vote value of the first virtual loudspeaker. The current-frame final vote value of the first virtual loudspeaker is a sum of the previous-frame final vote value of the first virtual loudspeaker and the current-frame initial vote value of the first virtual loudspeaker.

In a second possible case, the first quantity of virtual loudspeakers include the sixth quantity of virtual loudspeakers. The first quantity is greater than the sixth quantity. It may be understood that the first quantity of virtual loudspeakers further include another virtual loudspeaker in addition to the sixth quantity of virtual loudspeakers. The encoder 113 may update, based on the previous-frame final vote values of the sixth quantity of virtual loudspeakers, the current-frame initial vote values of the virtual loudspeakers that are in the first quantity of virtual loudspeakers and that have serial numbers the same as serial numbers of the sixth quantity of virtual loudspeakers. Therefore, the seventh quantity of virtual loudspeakers include the first quantity of virtual loudspeakers. The seventh quantity is equal to the first quantity. Serial numbers of the seventh quantity of virtual loudspeakers are the same as the serial numbers of the first quantity of virtual loudspeakers. The seventh quantity of current-frame final vote values include the current-frame final vote values of the virtual loudspeakers that are in the first quantity of virtual loudspeakers and that have the serial numbers the same as the serial numbers of the sixth quantity of virtual loudspeakers, and a current-frame final vote value of a virtual loudspeaker that is in the first quantity of virtual loudspeakers and that has a serial number different from the serial numbers of the sixth quantity of virtual loudspeakers.

The current-frame final vote values of the virtual loudspeakers that are in the first quantity of virtual loudspeakers and that have the serial numbers the same as the serial numbers of the sixth quantity of virtual loudspeakers are a sum of the previous-frame final vote values of the sixth quantity of virtual loudspeakers and the current-frame initial vote values of the first quantity of virtual loudspeakers. The current-frame final vote value of the virtual loudspeaker that is in the first quantity of virtual loudspeakers and that has the serial number different from the serial numbers of the sixth quantity of virtual loudspeakers is a current-frame initial vote value of the virtual loudspeaker that is in the first quantity of virtual loudspeakers and that has the serial number different from the serial numbers of the sixth quantity of virtual loudspeakers.

For example, it is assumed that the first quantity of virtual loudspeakers include the first virtual loudspeaker and a second virtual loudspeaker, the sixth quantity of virtual loudspeakers include the first virtual loudspeaker, and the sixth quantity of virtual loudspeakers do not include the second virtual loudspeaker. A current-frame final vote value of the second virtual loudspeaker is equal to a current-frame initial vote value of the second virtual loudspeaker. The encoder 113 may update the current-frame initial vote value of the first virtual loudspeaker based on a previous-frame final vote value of the first virtual loudspeaker, to obtain a current-frame final vote value of the first virtual loudspeaker. The current-frame final vote value of the first virtual loudspeaker is a sum of the previous-frame final vote value of the first virtual loudspeaker and the current-frame initial vote value of the first virtual loudspeaker.

In a third possible case, the first quantity of virtual loudspeakers include some of the sixth quantity of virtual loudspeakers, and the sixth quantity of virtual loudspeakers further include another virtual loudspeaker that has a serial number different from the serial numbers of the first quantity of virtual loudspeakers. Therefore, the seventh quantity of virtual loudspeakers include the first quantity of virtual loudspeakers, and the virtual loudspeaker that is in the sixth quantity of virtual loudspeakers and that has the serial number different from the serial numbers of the first quantity of virtual loudspeakers. The seventh quantity of current-frame final vote values include the current-frame final vote values of the first quantity of virtual loudspeakers and a current-frame final vote value of the virtual loudspeaker that is in the sixth quantity of virtual loudspeakers and that has the serial number different from the serial numbers of the first quantity of virtual loudspeakers.

The current-frame final vote values of the first quantity of virtual loudspeakers include the current-frame final vote values of the virtual loudspeakers that are in the first quantity of virtual loudspeakers and that have the serial numbers the same as the serial numbers of the sixth quantity of virtual loudspeakers. Optionally, the current-frame final vote values of the first quantity of virtual loudspeakers may further include the current-frame final vote value of the virtual loudspeaker that is in the first quantity of virtual loudspeakers and that has the serial number different from the serial numbers of the sixth quantity of virtual loudspeakers.

The current-frame final vote value of the virtual loudspeaker that is in the sixth quantity of virtual loudspeakers and that has the serial number different from the serial numbers of the first quantity of virtual loudspeakers is a previous-frame final vote value of the virtual loudspeaker that is in the sixth quantity of virtual loudspeakers and that has the serial number different from the serial numbers of the first quantity of virtual loudspeakers.

For example, it is assumed that the sixth quantity of virtual loudspeakers include the first virtual loudspeaker and a third virtual loudspeaker, the first quantity of virtual loudspeakers include the first virtual loudspeaker, and the first quantity of virtual loudspeakers do not include the third virtual loudspeaker. A current-frame final vote value of the third virtual loudspeaker is equal to a previous-frame final vote value of the third virtual loudspeaker. The encoder 113 may update the current-frame initial vote value of the first virtual loudspeaker based on a previous-frame final vote value of the first virtual loudspeaker, to obtain a current-frame final vote value of the first virtual loudspeaker. The current-frame final vote value of the first virtual loudspeaker is a sum of the previous-frame final vote value of the first virtual loudspeaker and the current-frame initial vote value of the first virtual loudspeaker.

Figure 8:
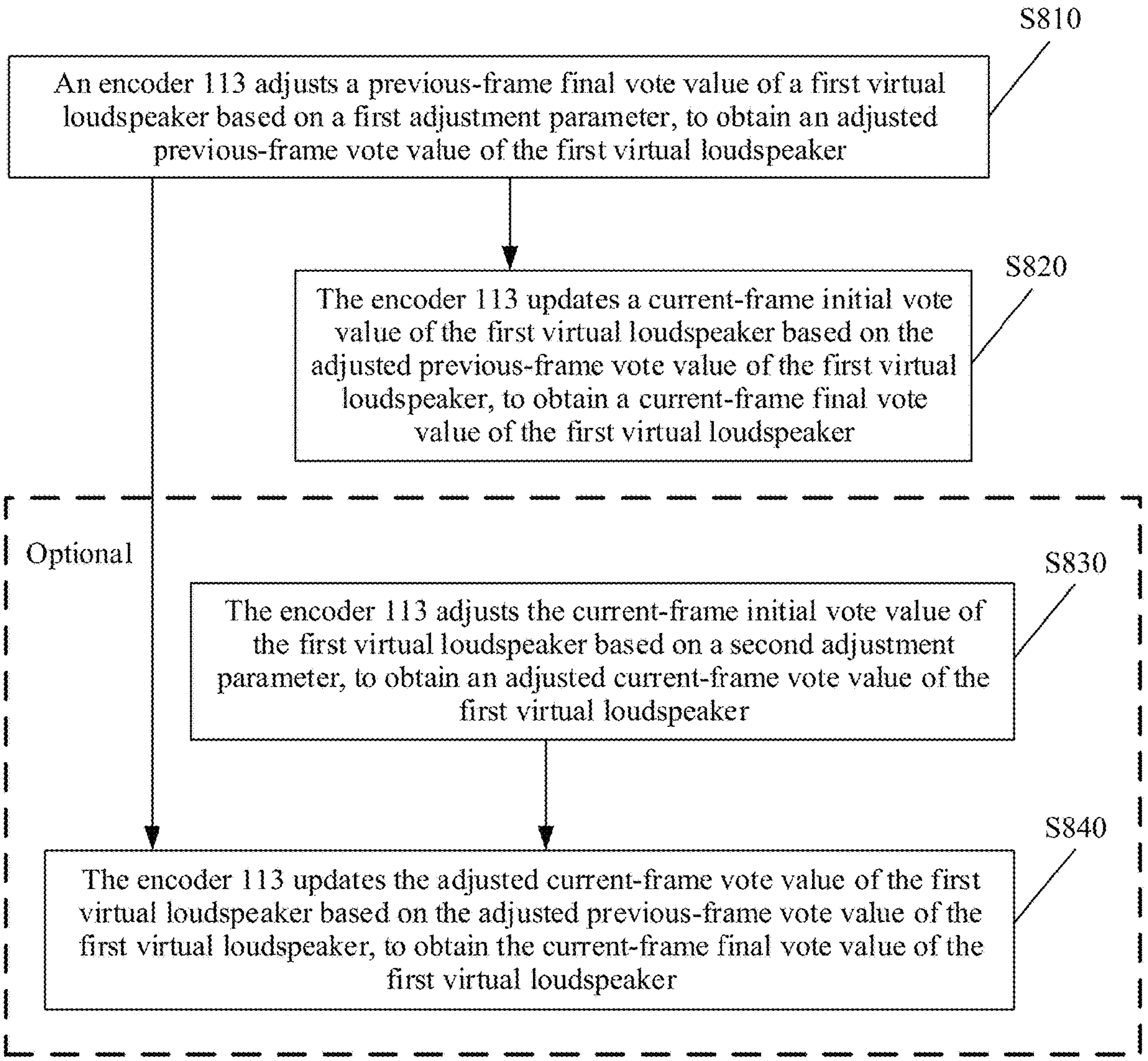
FIG. 8 is a schematic flowchart of a method for adjusting a vote value according to an embodiment of this application.

In some embodiments, FIG. 8 is a schematic flowchart of a method for updating a current-frame initial vote value of a virtual loudspeaker according to an embodiment of this application.

S810: The encoder 113 adjusts a previous-frame final vote value of a first virtual loudspeaker based on a first adjustment parameter, to obtain an adjusted previous-frame vote value of the first virtual loudspeaker.

The first adjustment parameter is determined based on at least one of a quantity of directional sound sources in the previous frame, an encoding bit rate for encoding the current frame, and a frame type. The adjusted previous-frame vote value of the first virtual loudspeaker satisfies the following formula (6):

$$\text{VOTE\_}f'_g=\text{VOTE\_}f_g\cdot w_1\cdot w_2\cdot w_3 \quad \text{formula (6)}$$

VOTE_f'$_g$; represents a set of adjusted previous-frame vote values, VOTE_f$_g$ represents a set of previous-frame final vote values, g represents a set of previous-frame representative virtual loudspeakers, $w_1$ represents a parameter related to the encoding bit rate, $w_2$ represents a parameter related to the frame type, and $w_3$ represents a parameter related to the quantity of directional sound sources. The frame type includes a transient frame or a non-transient frame.

For example, if the encoding bit rate is less than or equal to 128 kbps, $w_1=1$; or if the encoding bit rate is greater than 128 kbps, $w_1=0$. If the previous frame is a transient frame, $w_2=1$. If the previous frame is a non-transient frame, $w_2=0$. If the quantity of directional sound sources is greater than a preset quantity of virtual loudspeaker signals, $w_3=0.8$; or if the quantity of directional sound sources is less than or equal to a preset quantity of virtual loudspeaker signals, $w_3=0.5$.

S820: The encoder 113 updates the current-frame initial vote value of the first virtual loudspeaker based on the adjusted previous-frame vote value of the first virtual loudspeaker, to obtain the current-frame final vote value of the first virtual loudspeaker.

The current-frame final vote value of the first virtual loudspeaker is a sum of the adjusted previous-frame vote value of the first virtual loudspeaker and the current-frame initial vote value of the first virtual loudspeaker. The current-frame final vote value of the first virtual loudspeaker satisfies the following formula (7):

$$\text{VOTE\_}M_g=\text{VOTE\_}f'_g+\text{VOTE}_g \quad \text{formula (7)}$$

VOTE_M$_g$ represents a set of current-frame final vote values, VOTE_f'$_g$ represents a set of adjusted previous-frame vote values, and VOTE g represents a set of current-frame initial vote values.

In an embodiment, that the encoder 113 may update the current-frame initial vote value of the first virtual loudspeaker based on the adjusted previous-frame vote value of the first virtual loudspeaker includes the following operations.

S830: The encoder 113 adjusts the current-frame initial vote value of the first virtual loudspeaker based on a second adjustment parameter, to obtain an adjusted current-frame vote value of the first virtual loudspeaker.

The adjusted current-frame vote value of the first virtual loudspeaker satisfies the following formula (8):

$$\text{VOTE}'_g=\text{VOTE}_g\cdot w_4 \quad \text{formula (8)}$$

VOTE'$_g$ represents a set of adjusted current-frame vote values, and $w_4$ represents the second adjustment parameter. For example, if norm(VOTE$_g$)>norm (VOTE_f'$_g$).

$$w_4=\frac{norm(\text{VOTE\_f}'_g)}{norm(\text{VOTE}_g)}*1.5.$$

It may be understood that, when the current-frame initial vote value is greater than the adjusted previous-frame vote value, $w_4$ is used to indicate to increase the adjusted previous-frame vote value.

If norm (VOTE$_g$)≤norm (VOTE_f'$_g$), $w_4=1$. It may be understood that, when the current-frame initial vote value is less than or equal to the adjusted previous-frame vote value, there is no need to use $w_4$ to indicate to increase the adjusted previous-frame vote value.

The second adjustment parameter is determined based on the adjusted previous-frame vote value of the first virtual loudspeaker and the current-frame initial vote value of the first virtual loudspeaker.

S840: The encoder 113 updates the adjusted current-frame vote value of the first virtual loudspeaker based on the adjusted previous-frame vote value of the first virtual loudspeaker, to obtain the current-frame final vote value of the first virtual loudspeaker.

The current-frame final vote value of the first virtual loudspeaker is a sum of the adjusted previous-frame vote value of the first virtual loudspeaker and the adjusted current-frame vote value of the first virtual loudspeaker. The current-frame final vote value of the first virtual loudspeaker satisfies the following formula (9):

$$\text{VOTE\_}M_g=\text{VOTE\_}f'_g+\text{VOTE}'_g \quad \text{formula (9)}$$

VOTE_M$_g$ represents a set of current-frame final vote values, VOTE_f'$_g$ represents a set of adjusted previous-frame vote values, and VOTE'$_g$ represents a set of adjusted current-frame vote values.

S630: The encoder 113 selects a second quantity of current-frame representative virtual loudspeakers from the seventh quantity of virtual loudspeakers based on the seventh quantity of current-frame final vote values.

The encoder 113 selects the second quantity of current-frame representative virtual loudspeakers from the seventh quantity of virtual loudspeakers based on the seventh quantity of current-frame final vote values. In addition, current-frame final vote values of the second quantity of current-frame representative virtual loudspeakers are greater than a preset threshold.

The encoder 113 may alternatively select the second quantity of current-frame representative virtual loudspeakers from the seventh quantity of virtual loudspeakers based on the seventh quantity of current-frame final vote values. For example, the second quantity of current-frame final vote values are determined from the seventh quantity of current-frame final vote values based on a descending order of the seventh quantity of current-frame final vote values. In addition, virtual loudspeakers that are in the seventh quantity of virtual loudspeakers and that correspond to the second quantity of current-frame final vote values are used as the second quantity of current-frame representative virtual loudspeakers.

In an embodiment, if vote values of virtual loudspeakers that are in the seventh quantity of virtual loudspeakers and that have different serial numbers are the same, and the vote values of the virtual loudspeakers with different serial numbers are greater than the preset threshold, the encoder 113 may use all the virtual loudspeakers with different serial numbers as the current-frame representative virtual loudspeakers.

It should be noted that the second quantity is less than the seventh quantity. The seventh quantity of virtual loudspeakers include the second quantity of current-frame representative virtual loudspeakers. The second quantity may be preset, or the second quantity may be determined based on a quantity of sound sources in a sound field of the current frame. For example, the second quantity may be equal to the quantity of sound sources in the sound field of the current frame. Alternatively, the quantity of sound sources in the sound field of the current frame is processed based on a preset algorithm, and a quantity obtained through processing is used as the second quantity. The preset algorithm may be designed based on a requirement. For example, the preset algorithm may be: the second quantity=the quantity of sound sources in the sound field of the current frame+1, or the second quantity=the quantity of sound sources in the sound field of the current frame−1.

In an embodiment, before the encoder 113 encodes a next frame of the current frame, if the encoder 113 determines to encode the next frame by reusing the previous-frame representative virtual loudspeaker, the encoder 113 may use the second quantity of current-frame representative virtual loudspeakers as a second quantity of previous-frame representative virtual loudspeakers, and encode the next frame of the current frame by using the second quantity of previous-frame representative virtual loudspeakers.

S640: The encoder 113 encodes the current frame based on the second quantity of current-frame representative virtual loudspeakers, to obtain a bitstream.

The encoder 113 generates a virtual loudspeaker signal based on the second quantity of current-frame representative virtual loudspeakers and the current frame; and encodes the virtual loudspeaker signal to obtain the bitstream.

In a virtual loudspeaker search procedure, because locations of real sound sources do not necessarily overlap locations of virtual loudspeakers, the virtual loudspeakers do not necessarily one-to-one correspond to the real sound sources. In addition, in an actual complex scenario, the virtual loudspeakers may not represent an independent sound source in the sound field. In this case, the found virtual loudspeakers searched out between frames may change frequently. The frequent changes affect auditory experience of a listener. As a result, obvious noise appears in a three-dimensional audio signal obtained through decoding and reconstruction. In the virtual loudspeaker selection method according to this embodiment of this application, the previous-frame representative virtual loudspeaker is retained. To be specific, for virtual loudspeakers with same serial numbers, the current-frame initial vote value is adjusted based on the previous-frame final vote value, so that the encoder tends to select the previous-frame representative virtual loudspeaker. In this way, the directional continuity between the frames is enhanced. In addition, the parameter is adjusted to ensure that the previous-frame final vote value is not persistently retained, and to avoid a case in which the algorithm cannot adapt to a sound field change such as a movement of the sound source.

In addition, an embodiment of this application further provides a virtual loudspeaker selection method. The encoder may first determine whether the set of previous-frame representative virtual loudspeakers can be reused to encode a current frame. If the encoder reuses the set of previous-frame representative virtual loudspeakers to encode the current frame, the encoder does not perform the virtual loudspeaker search procedure. This effectively reduces the calculation complexity of searching for the virtual loudspeaker by the encoder. In this way, the calculation complexity of performing compression coding on the three-dimensional audio signal is reduced, and the calculation load of the encoder is reduced. If the encoder cannot reuse the set of previous-frame representative virtual loudspeakers to encode the current frame, the encoder then selects the representative coefficient, votes on each virtual loudspeaker in the set of candidate virtual loudspeakers by using a representative coefficient of the current frame, and selects the current-frame representative virtual loudspeaker based on the vote value, to achieve purposes of reducing the calculation complexity of performing compression coding on the three-dimensional audio signal and reducing the calculation load of the encoder. FIG. 9 is a schematic flowchart of a virtual loudspeaker selection method according to an embodiment of this application. Before the encoder 113 obtains a first quantity of current-frame initial vote values that are of a first quantity of virtual loudspeakers and that correspond to a current frame of a three-dimensional audio signal, that is, before S610 is performed, the method further includes the following operations, as shown in FIG. 9.

S650: The encoder 113 obtains a first correlation between the current frame of the three-dimensional audio signal and the set of previous-frame representative virtual loudspeakers.

The sixth quantity of virtual loudspeakers included in the set of previous-frame representative virtual loudspeakers, and the virtual loudspeaker included in the sixth quantity of virtual loudspeakers are previous-frame representative virtual loudspeakers used when the previous frame of the three-dimensional audio signal is encoded. The first correlation indicates a priority of reusing the set of previous-frame representative virtual loudspeakers when the current frame is encoded. The priority may alternatively be described as a preference. To be specific, the first correlation is used to determine whether the set of previous-frame representative virtual loudspeakers is reused when the current frame is encoded. It may be understood that a large first correlation of the set of previous-frame representative virtual loudspeakers indicates a high priority or a higher preference of the set of previous-frame representative virtual loudspeakers. The encoder 113 tends to select the previous-frame representative virtual loudspeaker to encode the current frame.

S660: The encoder 113 determines whether the first correlation meets a reuse condition.

If the first correlation does not meet the reuse condition, it indicates that the encoder 113 tends to search for a virtual loudspeaker. The current frame is encoded based on the current-frame representative virtual loudspeaker. S610 is performed. The encoder 113 obtains a first quantity of current-frame initial vote values that are of a first quantity of virtual loudspeakers and that correspond to a current frame of a three-dimensional audio signal.

In an embodiment, after selecting a third quantity of representative coefficients from a fourth quantity of coefficients based on frequency-domain feature values of the fourth quantity of coefficients, the encoder 113 may alternatively use a maximum representative coefficient in the third quantity of representative coefficients as a coefficient of the current frame for obtaining the first correlation. The encoder 113 obtains the first correlation between the maximum representative coefficient in the third quantity of representative coefficients of the current frame and the set of previous-frame representative virtual loudspeakers. If the first correlation does not meet the reuse condition, S6103 is performed, that is, the encoder 113 selects the second quantity of current-frame representative virtual loudspeakers from the first quantity of virtual loudspeakers based on the first quantity of vote values.

If the first correlation meets the reuse condition, it indicates that the encoder 113 tends to select the previous-frame representative virtual loudspeaker to encode the current frame. The encoder 113 performs S670 and S680.

S670: The encoder 113 generates a virtual loudspeaker signal based on the set of previous-frame representative virtual loudspeakers and the current frame.

S680: The encoder 113 encodes the virtual loudspeaker signal to obtain a bitstream.

In the virtual loudspeaker selection method according to this embodiment of this application, whether to search for the virtual loudspeaker is determined based on the correlation between the representative coefficient of the current frame and the previous-frame representative virtual loudspeaker. In this way, selection accuracy for the current-frame representative virtual loudspeaker based on the correlation is ensured, and complexity at an encoder side is effectively reduced.

It may be understood that, to implement the functions in the foregoing embodiment, the encoder includes corresponding hardware structures and/or software modules for performing the functions. A person skilled in the art should be easily aware that, in combination with the units and the method operations in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

The foregoing describes in detail the three-dimensional audio signal encoding method according to this embodiment with reference to FIG. 1 to FIG. 9. The following describes a three-dimensional audio signal encoding apparatus and an encoder according to this embodiment with reference to FIG. 10 and FIG. 11.

Figure 10:
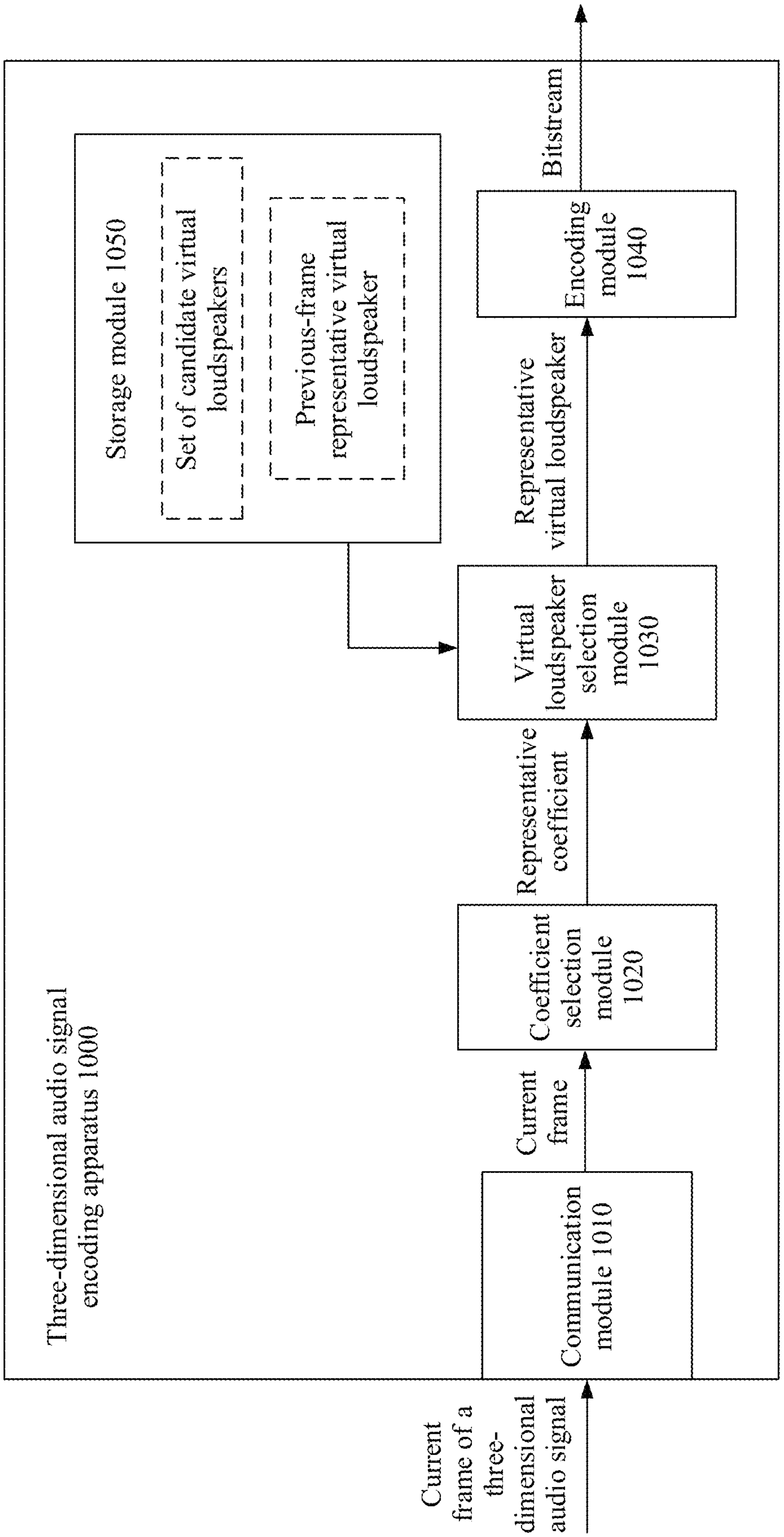
FIG. 10 is a schematic diagram of a structure of an encoding apparatus according to this application.

FIG. 10 is a schematic diagram of a possible structure of a three-dimensional audio signal encoding apparatus according to an embodiment of this application. These three-dimensional audio signal encoding apparatuses may be configured to implement the function of encoding a three-dimensional audio signal in the foregoing method embodiments, and therefore can also implement beneficial effects of the foregoing method embodiments. In this embodiment, the three-dimensional audio signal encoding apparatus may be the encoder 113 shown in FIG. 1, the encoder 300 shown in FIG. 3, or a module (such as a chip) applied to a terminal device or a server.

As shown in FIG. 10, the three-dimensional audio signal encoding apparatus 1000 includes a communication module 1010, a coefficient selection module 1020, a virtual loudspeaker selection module 1030, an encoding module 1040, and a storage module 1050. The three-dimensional audio signal encoding apparatus 1000 is configured to implement the functions of the encoder 113 in the method embodiments shown in FIG. 6 to FIG. 9.

The communication module 1010 is configured to obtain a current frame of a three-dimensional audio signal. Optionally, the communication module 1010 may alternatively receive a current frame of a three-dimensional audio signal obtained by another device, or obtain a current frame of a three-dimensional audio signal from the storage module 1050. The current frame of the three-dimensional audio signal is an HOA signal. A frequency-domain feature value of a coefficient is determined based on a coefficient of the HOA signal.

The virtual loudspeaker selection module 1030 is configured to obtain a first quantity of current-frame initial vote values for a current frame of a three-dimensional audio signal. A first quantity of virtual loudspeakers one-to-one correspond to the current-frame initial vote values. The first quantity of virtual loudspeakers include a first virtual loudspeaker, and a current-frame initial vote value of the first virtual loudspeaker indicates a priority of using the first virtual loudspeaker when the current frame is encoded.

The virtual loudspeaker selection module 1030 is further configured to obtain, based on the first quantity of current-frame initial vote values and a sixth quantity of previous-frame final vote values, a seventh quantity of current-frame final vote values that are of a seventh quantity of virtual loudspeakers and that correspond to the current frame. The seventh quantity of virtual loudspeakers include the first quantity of virtual loudspeakers. The seventh quantity of virtual loudspeakers include a sixth quantity of virtual loudspeakers. The sixth quantity of virtual loudspeakers one-to-one correspond to the sixth quantity of previous-frame final vote values. The sixth quantity of virtual loudspeakers are virtual loudspeakers used when a previous frame of the three-dimensional audio signal is encoded.

If the first quantity of virtual loudspeakers include a second virtual loudspeaker, and the sixth quantity of virtual loudspeakers do not include the second virtual loudspeaker, a current-frame final vote value of the second virtual loudspeaker is equal to a current-frame initial vote value of the second virtual loudspeaker. Alternatively, if the sixth quantity of virtual loudspeakers include a third virtual loudspeaker, and the first quantity of virtual loudspeakers do not include the third virtual loudspeaker, a current-frame final vote value of the third virtual loudspeaker is equal to a previous-frame final vote value of the third virtual loudspeaker.

When the three-dimensional audio signal encoding apparatus 1000 is configured to implement the functions of the encoder 113 in the method embodiments shown in FIG. 6 to FIG. 9, the virtual loudspeaker selection module 1030 is configured to implement the functions related to S610 to S630, and S650 to S680.

For example, when updating the current-frame initial vote value of the first virtual loudspeaker based on a previous-frame final vote value of the first virtual loudspeaker, the virtual loudspeaker selection module 1030 is configured to: adjust the previous-frame final vote value of the first virtual loudspeaker based on a first adjustment parameter, to obtain an adjusted previous-frame vote value of the first virtual loudspeaker; and update the current-frame initial vote value of the first virtual loudspeaker based on the adjusted previous-frame vote value of the first virtual loudspeaker.

For another example, when updating the current-frame initial vote value of the first virtual loudspeaker based on the adjusted previous-frame vote value of the first virtual loudspeaker, the virtual loudspeaker selection module 1030 is configured to: adjust the current-frame initial vote value of the first virtual loudspeaker based on a second adjustment parameter, to obtain an adjusted current-frame vote value of the first virtual loudspeaker; and update the adjusted current-frame vote value of the first virtual loudspeaker based on the adjusted previous-frame vote value of the first virtual loudspeaker.

The first adjustment parameter is determined based on at least one of a quantity of directional sound sources in the previous frame, an encoding bit rate for encoding the current frame, and a frame type.

The second adjustment parameter is determined based on the adjusted previous-frame vote value of the first virtual loudspeaker and the current-frame initial vote value of the first virtual loudspeaker.

When the three-dimensional audio signal encoding apparatus 1000 is configured to implement the functions of the encoder 113 in the method embodiment shown in FIG. 7, the coefficient selection module 1020 is configured to implement the functions related to S6101 and S6102. Specifically, when obtaining a third quantity of representative coefficients of the current frame, the coefficient selection module 1020 is configured to: obtain a fourth quantity of coefficients of the current frame and frequency-domain feature values of the fourth quantity of coefficients; and select the third quantity of representative coefficients from the fourth quantity of coefficients based on the frequency-domain feature values of the fourth quantity of coefficients. The third quantity is less than the fourth quantity.

The encoding module 1040 is configured to encode the current frame based on the second quantity of current-frame representative virtual loudspeakers, to obtain a bitstream.

When the three-dimensional audio signal encoding apparatus 1000 is configured to implement the functions of the encoder 113 in the method embodiments shown in FIG. 6 to FIG. 9, the encoding module 1040 is configured to implement the functions related to S630. For example, the encoding module 1040 is configured to: generate a virtual loudspeaker signal based on the second quantity of current-frame representative virtual loudspeakers and the current frame; and encode the virtual loudspeaker signal to obtain the bitstream.

The storage module 1050 is configured to store a coefficient related to the three-dimensional audio signal, a set of candidate virtual loudspeakers, a set of previous-frame representative virtual loudspeakers, a selected coefficient, a selected virtual loudspeaker, and the like, so that the encoding module 1040 encodes the current frame to obtain a bitstream, and transmits the bitstream to the decoder.

It should be understood that the three-dimensional audio signal encoding apparatus 1000 in this embodiment of this application may be implemented by using an application-specific integrated circuit (ASIC), or may be implemented by using a programmable logic device (PLD). The PLD may be a complex programmable logic device (CPLD), a field-programmable gate array (FPGA), generic array logic (GAL), or any combination thereof. When the three-dimensional audio signal encoding methods shown in FIG. 6 to FIG. 9 may alternatively be implemented by using software, the three-dimensional audio signal encoding apparatus 1000 and the modules thereof may alternatively be software modules.

For more detailed descriptions of the communication module 1010, the coefficient selection module 1020, the virtual loudspeaker selection module 1030, the encoding module 1040, and the storage module 1050, refer to related descriptions in the method embodiments shown in FIG. 6 to FIG. 9. Details are not described herein again.

Figure 11:
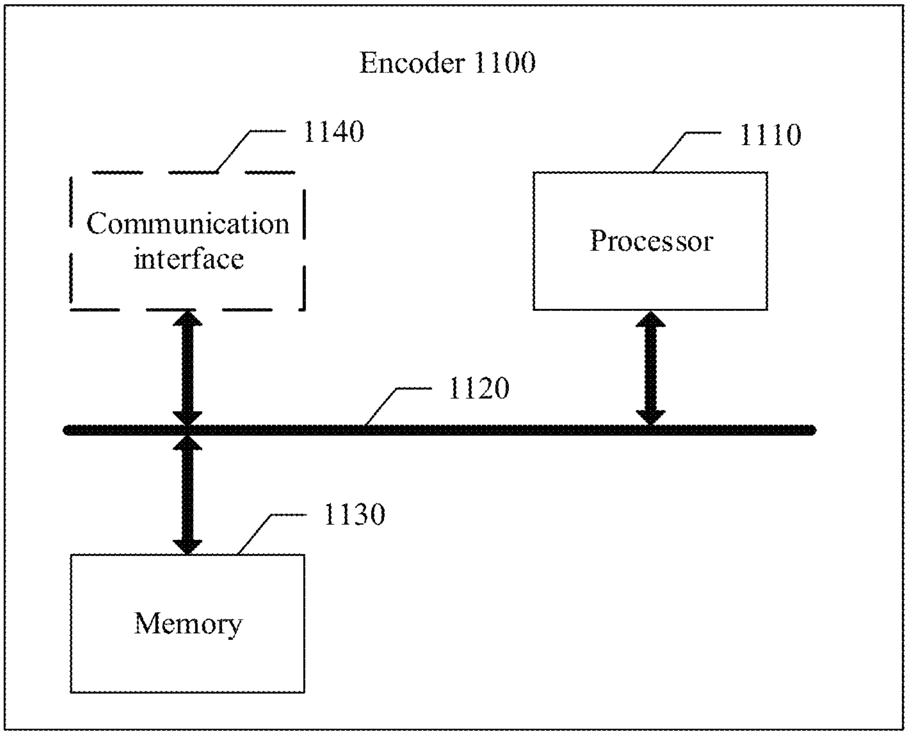
FIG. 11 is a schematic diagram of a structure of an encoder according to this application.

FIG. 11 is a schematic diagram of a structure of an encoder 1100 according to an embodiment of this application. As shown in FIG. 11, the encoder 1100 includes a processor 1110, a bus 1120, a memory 1130, and a communication interface 1140.

It should be understood that, in this embodiment, the processor 1110 may be a central processing unit (CPU). The processor 1110 may alternatively be another general-purpose processor, a digital signal processor (DSP), an ASIC, an FPGA or another programmable logic device, a discrete gate or a transistor logic device, a discrete hardware component, or the like. The general-purpose processor may be a microprocessor, any conventional processor, or the like.

The processor may alternatively be a graphics processing unit (GPU), a neural network processor (NPU), a microprocessor, or one or more integrated circuits used to control program execution in solutions of this application.

The communication interface 1140 is configured to implement communication between the encoder 1100 and an external device or component. In this embodiment, the communication interface 1140 is configured to receive a three-dimensional audio signal.

The bus 1120 may include a path, used to transmit information between the foregoing components (for example, the processor 1110 and the memory 1130). The bus 1120 may further include a power bus, a control bus, a state signal bus, and the like, in addition to a data bus. However, for clear description, the buses are marked as the bus 1120 in the figures.

In an example, the encoder 1100 may include a plurality of processors. The processor may be a multi-core (multi-CPU) processor. The processor herein may be one or more devices, circuits, and/or computing units configured to process data (for example, computer program instructions). The processor 1110 may invoke the coefficient related to a three-dimensional audio signal, the set of candidate virtual loudspeakers, the set of previous-frame representative virtual loudspeakers, the selected coefficient, the selected virtual loudspeaker, and the like that are stored in the memory 1130.

It should be noted that, in FIG. 11, only an example in which the encoder 1100 includes one processor 1110 and one memory 1130 is used. Herein, the processor 1110 and the memory 1130 separately indicate a type of component or device. In a specific embodiment, a quantity of components or devices of each type may be determined based on a service requirement.

The memory 1130 may correspond to a storage medium in the foregoing method embodiments, for example, a magnetic disk, such as a hard disk drive or a solid-state drive, configured to store information such as the coefficient related to the three-dimensional audio signal, the set of candidate virtual loudspeakers, the set of previous-frame representative virtual loudspeakers, the selected coefficient, and the selected virtual loudspeaker.

The encoder 1100 may be a general-purpose device or a dedicated device. For example, the encoder 1100 may be an X86- or ARM-based server, or may alternatively be another dedicated server such as a policy control and charging (PCC) server. A type of the encoder 1100 is not limited in this embodiment of this application.

It should be understood that the encoder 1100 according to this embodiment may correspond to the three-dimensional audio signal encoding apparatus 1000 in this embodiment, and may correspond to a corresponding body that performs the method according to any one of FIG. 6 to FIG. 9. In addition, the foregoing and other operations and/or functions of the modules in the three-dimensional audio signal encoding apparatus 1000 are separately used to implement corresponding procedures of the methods according to FIG. 6 to FIG. 9. For brevity, details are not described herein again.

The method operations in this embodiment may be implemented by using hardware, or may alternatively be implemented by a processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk drive, a removable hard disk drive, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in the ASIC. In addition, the ASIC may be located in a network device or a terminal device. Certainly, the processor and the storage medium may alternatively exist as discrete components in a network device or a terminal device.

All or some of the foregoing embodiments may be implemented by using software, hardware, firmware, or any combination thereof. When software is used to implement embodiments, all or a part of embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, a computer, a server, or a data center to another website, a computer, a server, or a data center in a wired manner or in a wireless manner. The computer-readable storage medium may be any usable medium that can be accessed by a computer, or a data storage device, such as a server or a data center, in which one or more usable media are integrated. The usable medium may be a magnetic medium, for example, a floppy disk, a hard disk drive, or a magnetic tape, or may alternatively be an optical medium, for example, a digital video disc (DVD), or may alternatively be a semiconductor medium, for example, a solid-state drive (SSD).

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for encoding three-dimensional audio signals, comprising:

obtaining a first quantity of current-frame initial vote values for a current frame of a three-dimensional (3D) audio signal, wherein a first quantity of virtual loudspeakers one-to-one correspond to the current-frame initial vote values, the first quantity of virtual loudspeakers comprise a first virtual loudspeaker, and a current-frame initial vote value of the first virtual loudspeaker indicates a priority of the first virtual loudspeaker;

obtaining, based on the first quantity of current-frame initial vote values and a sixth quantity of previous-frame final vote values, a seventh quantity of current-frame final vote values of a seventh quantity of virtual loudspeakers corresponding to the current frame, wherein the seventh quantity of virtual loudspeakers comprise the first quantity of virtual loudspeakers and a sixth quantity of virtual loudspeakers, the sixth quantity of virtual loudspeakers one-to-one correspond to the sixth quantity of previous-frame final vote values that are virtual loudspeakers used when a previous frame of the 3D audio signal is encoded;

selecting a second quantity of current-frame representative virtual loudspeakers from the seventh quantity of virtual loudspeakers based on the seventh quantity of current-frame final vote values, wherein the second quantity is less than the seventh quantity; and encoding the current frame based on the second quantity of current-frame representative virtual loudspeakers, to obtain a bitstream.

2. The method according to claim 1, wherein if the first quantity of virtual loudspeakers comprise a second virtual loudspeaker, and the sixth quantity of virtual loudspeakers do not comprise the second virtual loudspeaker, a current-frame final vote value of the second virtual loudspeaker is equal to a current-frame initial vote value of the second virtual loudspeaker; or if the sixth quantity of virtual loudspeakers comprise a third virtual loudspeaker, and the first quantity of virtual loudspeakers do not comprise the third virtual loudspeaker, a current-frame final vote value of the third virtual loudspeaker is equal to a previous-frame final vote value of the third virtual loudspeaker.

3. The method according to claim 1, wherein if the sixth quantity of virtual loudspeakers comprise the first virtual loudspeaker, obtaining a seventh quantity of current-frame final vote values of a seventh quantity of virtual loudspeakers corresponding to the current frame comprises:

updating the current-frame initial vote value of the first virtual loudspeaker based on a previous-frame final vote value of the first virtual loudspeaker, to obtain a current-frame final vote value of the first virtual loudspeaker.

4. The method according to claim 3, wherein the updating the current-frame initial vote value of the first virtual loudspeaker based on a previous-frame final vote value of the first virtual loudspeaker comprises:

adjusting the previous-frame final vote value of the first virtual loudspeaker based on a first adjustment parameter, to obtain an adjusted previous-frame vote value of the first virtual loudspeaker; and updating the current-frame initial vote value of the first virtual loudspeaker based on the adjusted previous-frame vote value of the first virtual loudspeaker.

5. The method according to claim 4, wherein the updating the current-frame initial vote value of the first virtual loudspeaker based on the adjusted previous-frame vote value of the first virtual loudspeaker comprises:

adjusting the current-frame initial vote value of the first virtual loudspeaker based on a second adjustment parameter, to obtain an adjusted current-frame vote value of the first virtual loudspeaker; and updating the adjusted current-frame vote value of the first virtual loudspeaker based on the adjusted previous-frame vote value of the first virtual loudspeaker.

6. The method according to claim 4, wherein the first adjustment parameter is determined based on at least one of a quantity of directional sound sources in the previous frame, an encoding bit rate for encoding the current frame, and a frame type of the current frame.

7. The method according to claim 5, wherein the second adjustment parameter is determined based on the adjusted previous-frame vote value of the first virtual loudspeaker and the current-frame initial vote value of the first virtual loudspeaker.

8. The method according to claim 1, wherein obtaining a first quantity of current-frame initial vote values of the first quantity of virtual loudspeakers corresponding to a current frame of a 3D audio signal comprises:

determining the first quantity of virtual loudspeakers and the first quantity of current-frame initial vote values based on a third quantity of representative coefficients of the current frame, a set of candidate virtual loudspeakers, and a quantity of vote rounds, wherein the set of candidate virtual loudspeakers comprises a fifth quantity of virtual loudspeakers that comprise the first quantity of virtual loudspeakers, the first quantity is less than or equal to the fifth quantity, the quantity of vote rounds is an integer greater than or equal to 1, and the quantity of vote rounds is less than or equal to the fifth quantity.

9. The method according to claim 8, wherein before determining the first quantity of virtual loudspeakers and the first quantity of current-frame initial vote values, the method further comprises:

obtaining a fourth quantity of coefficients of the current frame and frequency-domain feature values of the fourth quantity of coefficients; and selecting the third quantity of representative coefficients from the fourth quantity of coefficients based on the frequency-domain feature values of the fourth quantity of coefficients, wherein the third quantity is less than the fourth quantity.

10. The method according to claim 9, further comprising:

obtaining a first correlation between the current frame and a set of previous-frame representative virtual loudspeakers that comprises the sixth quantity of virtual loudspeakers representing previous-frame representative virtual loudspeakers used when the previous frame is encoded, wherein the first correlation is used to determine whether the set of previous-frame representative virtual loudspeakers is reused when the current frame is encoded; and if the first correlation does not meet a reuse condition, obtaining the fourth quantity of coefficients of the current frame of the 3D audio signal and the frequency-domain feature values of the fourth quantity of coefficients.

11. The method according to claim 1, wherein the current frame of the 3D audio signal is a higher-order ambisonics (HOA) signal, and the frequency-domain feature value of the coefficient of the current frame is determined based on a coefficient of the HOA signal.

12. An encoder, comprising:

at least one processor and a memory to store a computer program, which when executed by the at least one processor, cause the at least one processor to perform a method of encoding three-dimensional signals, the method comprising:

obtaining a first quantity of current-frame initial vote values for a current frame of a 3D audio signal, wherein a first quantity of virtual loudspeakers one-to-one correspond to the current-frame initial vote values, the first quantity of virtual loudspeakers comprise a first virtual loudspeaker, and a current-frame initial vote value of the first virtual loudspeaker indicates a priority of the first virtual loudspeaker;

obtaining, based on the first quantity of current-frame initial vote values and a sixth quantity of previous-frame final vote values, a seventh quantity of current-frame final vote values of a seventh quantity of virtual loudspeakers corresponding to the current frame, wherein the seventh quantity of virtual loudspeakers comprise the first quantity of virtual loudspeakers and a sixth quantity of virtual loudspeakers, the sixth quantity of virtual loudspeakers one-to-one correspond to the sixth quantity of previous-frame final vote values, and the sixth quantity of virtual loudspeakers are virtual loudspeakers used when a previous frame of the 3D audio signal is encoded;

selecting a second quantity of current-frame representative virtual loudspeakers from the seventh quantity of virtual loudspeakers based on the seventh quantity of current-frame final vote values, wherein the second quantity is less than the seventh quantity; and encoding the current frame based on the second quantity of current-frame representative virtual loudspeakers, to obtain a bitstream.

13. The encoder according to claim 12, wherein if the first quantity of virtual loudspeakers comprise a second virtual loudspeaker, and the sixth quantity of virtual loudspeakers do not comprise the second virtual loudspeaker, a current-frame final vote value of the second virtual loudspeaker is equal to a current-frame initial vote value of the second virtual loudspeaker; or if the sixth quantity of virtual loudspeakers comprise a third virtual loudspeaker, and the first quantity of virtual loudspeakers do not comprise the third virtual loudspeaker, a current-frame final vote value of the third virtual loudspeaker is equal to a previous-frame final vote value of the third virtual loudspeaker.

14. The encoder according to claim 12, wherein if the sixth quantity of virtual loudspeakers comprise the first virtual loudspeaker, obtaining a seventh quantity of current-frame final vote values of a seventh quantity of virtual loudspeakers corresponding to the current frame comprises:

updating the current-frame initial vote value of the first virtual loudspeaker based on a previous-frame final vote value of the first virtual loudspeaker, to obtain a current-frame final vote value of the first virtual loudspeaker.

15. The encoder according to claim 14, wherein the updating the current-frame initial vote value of the first virtual loudspeaker based on a previous-frame final vote value of the first virtual loudspeaker comprises:

adjusting the previous-frame final vote value of the first virtual loudspeaker based on a first adjustment parameter, to obtain an adjusted previous-frame vote value of the first virtual loudspeaker; and updating the current-frame initial vote value of the first virtual loudspeaker based on the adjusted previous-frame vote value of the first virtual loudspeaker.

16. A system, comprising the encoder according to claim 12 and a decoder, wherein the decoder is configured to decode a bitstream generated by the encoder.

17. A non-transitory computer-readable storage medium comprising computer software instructions stored therein, which when executed on an encoder, cause the encoder to perform a three-dimensional audio signal encoding method, the method comprising:

obtaining a first quantity of current-frame initial vote values for a current frame of a three-dimensional (3D) audio signal, wherein a first quantity of virtual loudspeakers one-to-one correspond to the current-frame initial vote values, the first quantity of virtual loudspeakers comprise a first virtual loudspeaker, and a current-frame initial vote value of the first virtual loudspeaker indicates a priority of the first virtual loudspeaker;

obtaining, based on the first quantity of current-frame initial vote values and a sixth quantity of previous-frame final vote values, a seventh quantity of current-frame final vote values of a seventh quantity of virtual loudspeakers corresponding to the current frame, wherein the seventh quantity of virtual loudspeakers comprise the first quantity of virtual loudspeakers and a sixth quantity of virtual loudspeakers, the sixth quantity of virtual loudspeakers one-to-one correspond to the sixth quantity of previous-frame final vote values, and the sixth quantity of virtual loudspeakers are virtual loudspeakers used when a previous frame of the 3D audio signal is encoded;

selecting a second quantity of current-frame representative virtual loudspeakers from the seventh quantity of virtual loudspeakers based on the seventh quantity of current-frame final vote values, wherein the second quantity is less than the seventh quantity; and encoding the current frame based on the second quantity of current-frame representative virtual loudspeakers, to obtain a bitstream.

18. A non-transitory computer-readable storage medium, comprising a bitstream obtained by using a three-dimensional audio signal encoding method, the method comprising:

obtaining a first quantity of current-frame initial vote values for a current frame of a three-dimensional (3D) audio signal, wherein a first quantity of virtual loudspeakers one-to-one correspond to the current-frame initial vote values, the first quantity of virtual loudspeakers comprise a first virtual loudspeaker, and a current-frame initial vote value of the first virtual loudspeaker indicates a priority of the first virtual loudspeaker;

obtaining, based on the first quantity of current-frame initial vote values and a sixth quantity of previous-frame final vote values, a seventh quantity of current-frame final vote values of a seventh quantity of virtual loudspeakers corresponding to the current frame, wherein the seventh quantity of virtual loudspeakers comprise the first quantity of virtual loudspeakers, the seventh quantity of virtual loudspeakers comprise a sixth quantity of virtual loudspeakers, the sixth quantity of virtual loudspeakers one-to-one correspond to the sixth quantity of previous-frame final vote values, and the sixth quantity of virtual loudspeakers are virtual loudspeakers used when a previous frame of the 3D audio signal is encoded;

selecting a second quantity of current-frame representative virtual loudspeakers from the seventh quantity of virtual loudspeakers based on the seventh quantity of current-frame final vote values, wherein the second quantity is less than the seventh quantity; and encoding the current frame based on the second quantity of current-frame representative virtual loudspeakers, to obtain a bitstream.

19. The computer-readable storage medium according to claim 17, wherein if the first quantity of virtual loudspeakers comprise a second virtual loudspeaker, and the sixth quantity of virtual loudspeakers do not comprise the second virtual loudspeaker, a current-frame final vote value of the second virtual loudspeaker is equal to a current-frame initial vote value of the second virtual loudspeaker; or if the sixth quantity of virtual loudspeakers comprise a third virtual loudspeaker, and the first quantity of virtual loudspeakers do not comprise the third virtual loudspeaker, a current-frame final vote value of the third virtual loudspeaker is equal to a previous-frame final vote value of the third virtual loudspeaker.

20. The computer-readable storage medium according to claim 18, wherein if the first quantity of virtual loudspeakers comprise a second virtual loudspeaker, and the sixth quantity of virtual loudspeakers do not comprise the second virtual loudspeaker, a current-frame final vote value of the second virtual loudspeaker is equal to a current-frame initial vote value of the second virtual loudspeaker; or if the sixth quantity of virtual loudspeakers comprise a third virtual loudspeaker, and the first quantity of virtual loudspeakers do not comprise the third virtual loudspeaker, a current-frame final vote value of the third virtual loudspeaker is equal to a previous-frame final vote value of the third virtual loudspeaker.

* * * * *